US010599981B2

(12) United States Patent
Zhang et al.

(10) Patent No.: US 10,599,981 B2
(45) Date of Patent: Mar. 24, 2020

(54) SYSTEM AND METHOD FOR ESTIMATING AUDIENCE INTEREST

(71) Applicant: NEW YORK UNIVERSITY, New York, NY (US)

(72) Inventors: Xiaohan Zhang, Brooklyn, NY (US); Foster Provost, New York, NY (US); Kiril Tsemekhman, New York, NY (US)

(73) Assignee: New York University, New York, NY (US)

( * ) Notice: Subject to any disclaimer, the term of this patent is extended or adjusted under 35 U.S.C. 154(b) by 675 days.

(21) Appl. No.: 14/428,265

(22) PCT Filed: Sep. 17, 2013

(86) PCT No.: PCT/US2013/060156
§ 371 (c)(1),
(2) Date: Mar. 13, 2015

(87) PCT Pub. No.: WO2014/043699
PCT Pub. Date: Mar. 20, 2014

(65) Prior Publication Data
US 2015/0242751 A1    Aug. 27, 2015

Related U.S. Application Data

(60) Provisional application No. 61/702,096, filed on Sep. 17, 2012.

(51) Int. Cl.
*G06N 5/04* (2006.01)
*G06Q 30/02* (2012.01)
(Continued)

(52) U.S. Cl.
CPC .............. *G06N 5/04* (2013.01); *G06F 17/16* (2013.01); *G06F 17/18* (2013.01); *G06N 7/005* (2013.01); *G06Q 30/02* (2013.01)

(58) Field of Classification Search
CPC .......... G06N 5/04; G06N 7/005; G06F 17/16; G06F 17/18; G06F 17/30035;
(Continued)

(56) References Cited

U.S. PATENT DOCUMENTS 8,838,688 B2 *  9/2014  Lin ........................ G06F 15/16
                                                          705/14.66
8,930,400 B2 *  1/2015  Adamic ............ G06F 17/30613
                                                          707/706

(Continued)

OTHER PUBLICATIONS

Hu et al. "A Hybrid User and Item-based Collaborative Filtering with Smoothing on Sparse Data", ICAT, 2006, pp. 6.*
(Continued)

*Primary Examiner* — Li Wu Chang
(74) *Attorney, Agent, or Firm* — Hunton Andrews Kurth LLP

(57) ABSTRACT

Systems, methods and computer-accessible mediums can be provided that can determine an audience interest distribution(s) of content(s) by, for example, receiving first information related to a web behavior(s) of a user(s), determining second information related to a user interest distribution(s) of the user(s) based on the first information, and determining determine the audience interest distribution(s) of the content(s) based on the second information.

19 Claims, 14 Drawing Sheets

(51) Int. Cl.
  *G06F 17/16* (2006.01)
  *G06F 17/18* (2006.01)
  *G06N 7/00* (2006.01)
(58) Field of Classification Search
  CPC ......... G06F 17/30867; G06F 17/30613; G06F 17/30684; G06F 15/16; G06Q 30/02; G06Q 30/00; A01G 25/092
  USPC .......... 707/734, 706; 706/50, 48; 705/14.66, 705/26.7, 7.29, 14.42; 715/738
  See application file for complete search history.

(56) References Cited

U.S. PATENT DOCUMENTS

| | | | | |
|---|---|---|---|---|
| 9,031,870 | B2* | 5/2015 | Kenedy | G06F 17/30867 705/26.7 |
| 9,569,432 | B1* | 2/2017 | Marra | G06F 17/30 |
| 9,600,581 | B2* | 3/2017 | Chu | G06F 17/30867 |
| 9,607,077 | B2* | 3/2017 | Li | G06F 17/30684 |
| 2006/0294124 | A1* | 12/2006 | Cho | G06F 17/30864 |
| 2008/0097834 | A1* | 4/2008 | McElfresh | G06Q 30/02 705/7.29 |
| 2010/0122178 | A1* | 5/2010 | Konig | G06F 17/30867 715/738 |
| 2010/0241625 | A1* | 9/2010 | Aravamudan | G06F 17/30035 707/734 |
| 2011/0213762 | A1* | 9/2011 | Sherrets | G06Q 30/02 707/706 |
| 2011/0246285 | A1* | 10/2011 | Ratnaparkhi | G06Q 30/00 705/14.42 |
| 2012/0136855 | A1* | 5/2012 | Ni | G06F 17/30867 707/724 |
| 2012/0254091 | A1* | 10/2012 | Klawinski | A01G 25/092 706/50 |
| 2013/0103609 | A1* | 4/2013 | Kirshenbaum | G06Q 30/02 705/347 |
| 2015/0112918 | A1* | 4/2015 | Zheng | G06Q 30/02 706/48 |

OTHER PUBLICATIONS

International Search Report for International Patent Application No. PCT/US2013/060156 dated Jan. 16, 2014.
International Written Opinion for International Patent Application No. PCT/US2013/060156 dated Jan. 16, 2014.
Adomavicius, Gediminas et al., "Toward the next generation of recommender systems: A survey of the state-of-the-art and possible extensions," IEEE Transactions on Knowledge and Data Engineering vol. 17, No. 6, pp. 734-749, 2005.
Attenberg, Josh et al., "Why Label When you Can Search? Alternatives to Active Learning for Applying Human Resources to Build Classification Models under Extreme Class Imbalance," Online active inference and learning, KDD, Jul. 25-28, 2010, pp. 186-194.
Bilenko, Mikhail et al., "Targeted, Not Tracked: Client-Side Solutions for Privacy-Friendly Behavioral Advertising," Predictive client-side profiles for personalized advertising. Proceedings of the 17th ACM SIGKDD international conference on Knowledge discovery and data mining, KDD, pp. 413-421, 2011.
Broder, Andrei et al., "A Semantic approach to contextual advertising," Proceedings of the 30th annual international ACM SIGIR conference on Research and development in information retrieval, SIGIR, pp. 559-566, 2007.
Chen, Ye et al., "Large-Scale Behavioral Targeting," Proceedings of the 15th ACM SIGKDD international conference on Knowledge discovery and data mining, KDD, pp. 209-218, 2009.
Chu, Wei et al., "Personalized Recommendation on Dynamic Content using Predictive Bilinear Models," Proceedings of the 18th international conference on World wide web, WWW, pp. 691-700, 2009.
Damasio, Manuel Jose et al., "Running Ahead: Understanding online audiences: New research approaches," Media Psycholog Review, pp. 1-18, 2008.
Dean, Jeffrey et al., "MapReduce: Simplified Data Processing on Large Clusters," Communication ACM vol. 51, No. 1, pp. 107-113, 2008.
Desrosiers, Christian et al., "A Comprehensive Survey of Neighborhood-based Recommendation Methods," Recommender Systems Handbook, pp. 107-144, 2011.
Eckersley, Peter "Browser Versions Carry 10.5 bits of Identifying Information on Average," URL https://www.eff.org/deeplinks/2010/01/tracking-by-user-agent, 2010.
HockeyBroad "Dear SI: Not all female hockey fans are puck bunnies," URL http://www.hockeybroad.com/2012/03/dear-si-not-all-female-hockey-fans-are.html, Mar. 9, 2012.
Huang, Zan et al., "Analyzing Consumer-product graphs: Empirical Findings and Applications in Recommender Systems," Manage Science, vol. 53, No. 7, pp. 1146-1164, 2007.
Ipeirotis, Panagiotis G., et al., "Quality Management on Amazon Mechanical Turk," Proceedings of the ACM SIGKDD Workshop on Human Computation, HCOMP, pp. 64-67, 2010.
Koren, Yehuda et al., "Matrix Factorization Techniques for Recommender Systems," Computer, vol. 42, No. 8, pp. 30-37, 2009.
Li, Ting et al., "A Markov Chain Model for Integrating Behavioral Targeting into Contextual Advertising," Proceedings of the Third International Workshop on Data Mining and Audience Intelligence for Advertising, ADKDD, pp. 1-9, Jun. 28, 2009.
Lops, Pasquale et al., "Content-based Recommender Systems: State of the art and trends," Recommender Systems Handbook, pp. 73-105, 2011.
Manning, Christopher D. et al., "Introduction to Information Retrieval," Cambridge University Press, New York, NY, USA, pp. 100-103, 2008.
Minka, Thomas P. "Bayesian Inference, Entropy and the Multinomial Distribution," Technical report, Microsoft Research, pp. 1-11, Jan. 2, 2003.
Murphy, Kevin P., "Binomial and Multinomial Distributions," Technical Report, University of British Columbia, pp. 1-16, Oct. 24, 2006.
Pandey, Sandeep et al., "Learning to Target: What works for behavioral Targeting," Proceedings of the 20th ACM international conference on Information and knowledge management, CIKM, pp. 1805-1814, 2011.
Provost, Foster J. et al., "Audience Selection for on-line Brand Advertising: Privacy-Friendly Social Network Targeting," KDD, pp. 707-716, 2009.
Ribeiro-Neto, Berthier et al. "Impedance Coupling in Content-Targeted Advertising," Proceedings of the 28th annual international ACM SIGIR conference on Research and development in information retrieval, SIGIR, pp. 496-503, 2005.
The Apache Software, Foundation. Hadoop. URL http://hadoop.apache.org, 2012.
The Apache Software, Foundation. Pig. URL http://pig.apache.org/, 2012.
Umyarov, Akhmed et al "Using External Aggregate Ratings for Improving Individual Recommendations," ACM Trans. Web vol. 5, No. 1, Article 3, pp. 1-40, Feb. 2011.
"Categorical Distribution," Wikipedia, the free encyclopedia, pp. 1-8, 2012.
Weisstein, Eric W. "Kronecker Delta," MathWorld—A Wolfram Web Resource, http://mathworld.wolfram.com/KroneckerDelta.html.
Yan, Jun et al, "How much can Behavioral targeting help Online Advertising?," Proceedings of the 18th international conference on World wide web, WWW, pp. 261-270, 2009.
The Apache Software, Foundation. 2012 Hbase. URL http://hbase.apache.org/, 2012.
Chen, Yet et al., "Behavioral Targeting: The Art of Scaling up Simple Algorithms," ACM Trans. Knowl. Discov. Data, vol. 4, No. 4, pp. 17:1-17:31, Oct. 2010.

(56) References Cited

OTHER PUBLICATIONS

Wasserman, Larry "All of Statistics, A Concise Coma in Statistical Inference," Springer, pp. 1-442, 2005.

* cited by examiner

SYSTEM AND METHOD FOR ESTIMATING AUDIENCE INTEREST

CROSS-REFERENCE TO RELATED APPLICATION(S)

This application relates to and claims the benefit and priority from International Patent Application No. PCT/US2013/060156 filed Sep. 17, 2013, which claims the benefit and priority from U.S. Provisional Patent Application No. 61/702,096, filed on Sep. 17, 2012, the entire disclosures of which are incorporated herein by reference in their entireties.

FIELD OF THE DISCLOSURE

The present disclosure relates generally to the prediction of audience interest in a web page, and more specifically, to exemplary embodiments of systems, methods and computer-accessible medium for estimating and/or determining an audience interest based on audience web behavior.

BACKGROUND INFORMATION

A goal of many different online enterprises can be to understand the visitors to particular websites and webpages. (See, e.g., Reference 8). Understanding one property of online visitors—the interests of these visitors to a particular website or webpage, (e.g., the audience interests of that website or webpage)—can be especially beneficial to a variety of online players. Knowledge of audience interests can facilitate website operators to optimize their content and navigation, create better content for their audience, improve site merchandizing such as the placement of product links and internal offers, solicit sponsorship, and perform other audience analytics. In addition, understanding audience interests can be a key goal of many players in the online advertising industry, where advertisers can associate brand advertisements with the interests of website visitors. For example, Proctor & Gamble may want to place Olay advertisements on webpages whose audience interests include the category "beauty".

Previous research has been done related to audience interest model and study. Behavioral targeting ("BT") procedures (see, e.g., Reference 5) can analyze historical user behavior in an attempt to deliver relevant advertisements to the user. BT aims to increase advertising revenue through maximizing proxy measures such as the click through rate ("CTR") (e.g., the percentage of browsers who click on an advertisement, out of the total number of browsers who are shown the advertisement) or conversions. (See, e.g., Reference 33). (See, e.g., Reference 23) Other procedures can extract quasi-social networks from users' browsing behavior for the purpose of improving brand advertising targeting. Similar to BT, user interests can be modeled from users' browsing behavior.

Contextual targeting ("CT") procedures (see, e.g., References 4, 24) aim to place advertisements that match the content of the websites, so as to increase revenue of both publishers and ad-networks, and also to improve user experience. For example, previous methods propose to integrate behavioral targeting into contextual advertising to improve the relevance of advertisements retrieved. (See, e.g., Reference 17) However, (i) CT does not model/profile user interests, but focuses on content of websites; (ii) CT focuses specifically on the interests represented explicitly on the webpages, rather than the more general interests of the audience, and (iii) the goal of CT can be to maximize advertising revenue, Outside of the realm of web audience analysis, techniques for recommender systems have been proposed. (See, e.g., Reference 1) The majority of the use of recommender systems can be based on two main approaches, content filtering and collaborative filtering. Content filtering (see, e.g., Reference 18) can build profiles for items (e.g., actors, directors, and genres for movies, etc.) and users (e.g., demographic information, and information through explicit user feedback) in order to recommend items similar to those items a given user may have liked in the past. For example, previous methods describe a learning-driven client-side keyword-based personalization approach for search advertising. (See, e.g., Reference 3). They can allow advertisers to customize existing search advertising campaigns based on users' prior behavior, while facilitating users to opt out from server-side storage of their behavioral history. For example, previous work describes predictive bilinear regression models which can be used to combine both profiles of contents (e.g., popularity and freshness) and profiles of users (e.g., demographic information, and summary of online activities) in order to provide personalized recommendations of new items to users.

Collaborative filtering can exploit relationships between users and interdependencies among items. Both neighborhood methods (e.g., computing similarities between users and/or items, (see, e.g., Reference 10) and matrix factorization methods (e.g., extracting latent factors characterizing users and items, (see, e.g., Reference 16)) have been studied extensively. Collaborative filtering based recommendation systems have been proposed which illustrate that the recommender-system-induced graphs generally provide a better match with the real-world consumer-product graphs than purely random graphs. New developments can extend the range of recommender systems to group-level recommenders, for example, to recommend a joint skiing vacation for a group of friends. (See, e.g., Reference 29). They can also propose to improve individual-level rating predictions by relying on aggregate rating data.

Thus, it may be beneficial to provide exemplary systems, methods and computer-accessible mediums that can estimate the distribution of a target website's audience interests based one users' online behavior, and which can overcome at least some of the deficiencies described herein above.

SUMMARY OF EXEMPLARY EMBODIMENTS

Systems, methods and computer-accessible mediums can be provided that can determine an audience interest distribution(s) of content(s) by, for example, receiving first information related to a web behavior(s) of a user(s), determining second information related to a user interest distribution(s) of the user(s) based on the first information, and determining the audience interest distribution(s) of the content(s) based on the second information. The audience interest distribution can be determined based on a probabilistic model(s) of the second information. The probabilistic model(s) can include a maximum likelihood estimator.

In some exemplary embodiments of the present disclosure, the content(s) can include a webpage(s). The behavior can include a web behavior of the user(s), and can include substantially anonymous web behavior. The behavior can also include visits by the user(s) to a webpage(s). In certain exemplary embodiments of the present disclosure, the second information can be determined based on a plurality of topical interest categories associated with the webpage(s). The user interest distribution can include further information related to inherent preferences by the user(s) for a particular topic(s) of interest. The user interest distribution(s) can include a plurality of user interest distributions, and the audience interest distribution can be determined using a weighted mean of the user interest distributions. The weighted mean can be based on an expected number of views of the content(s).

In some exemplary embodiments of the present disclosure, the user interest distribution(s) can be modeled using a matrix(s), and each row vector of the matrix(s) can represent the user's user interest distribution and each column of the matrix(s) can represent a category's audience interest for all users. The audience interest distribution(s) can be determined based on a multinomial distribution model of the second information. The second information can be determined by inferring the user interest distribution(s) based on an inference model. The inference model can be an estimation of the user's inherent interest distribution based on the behavior(s) of the user(s). The inference model can be generated by probabilistically modeling visits of the user(s) to a plurality of websites. The behavior of the user(s) can be modeled using a bipartite graph(s). The behavior(s) can also exclude information related to the content(s).

In a further exemplary embodiment of the present disclosure are exemplary systems, methods and computer-accessible mediums that can determine an audience interest distribution(s) of content(s) by, for example, receiving first information related to a user interest distribution(s) of the user(s), and determine the audience interest distribution(s) of the content(s) based on the second information.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
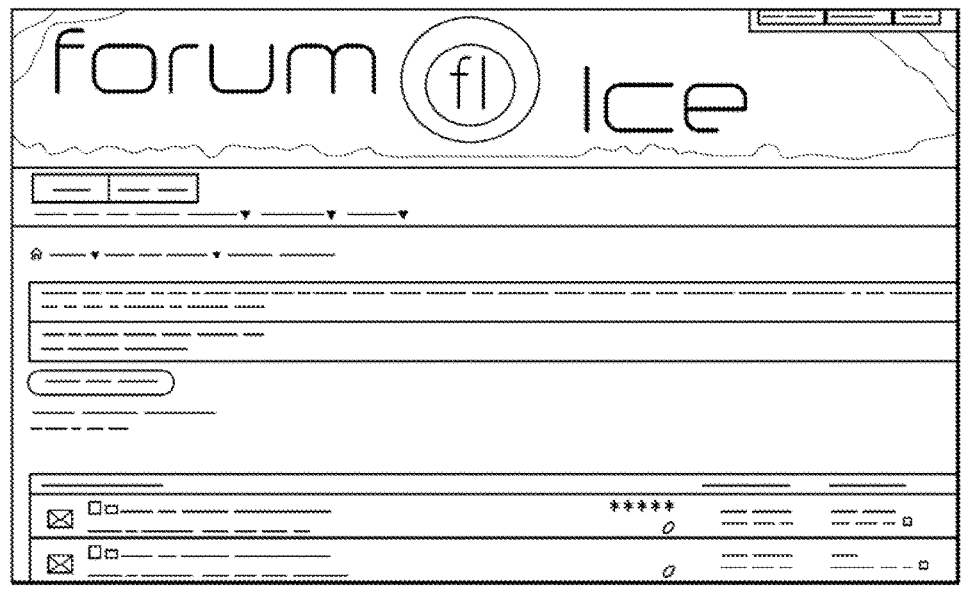
FIG. 1 is an exemplary image of an exemplary website forum for the Montreal Canadians.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures or in the appended claims.

DETAILED DESCRIPTION OF EXEMPLARY EMBODIMENTS

"Website", "site", "webpage", and "page" can all be used as a general term for web content, if not otherwise stated. It can range from an individual Uniform Resource Locator ("URL") (e.g., http://money.cnn.com/quote/quote.html?symb=GOOG), a URL prefix (e.g., money.cnn.com/quote) or a collection of related URLs (e.g., a general domain like money.cnn.com), depending on the context and application. It is possible to consider individual URLs, unless stated otherwise, but the exemplary model can be applied to any form of website aggregation.

The exemplary systems, methods and computer-accessible mediums, according to an exemplary embodiment of the present disclosure, can estimate the distribution of a target website's audience interests based one users' online behavior. The exemplary systems, methods and computer-accessible mediums, according to an exemplary embodiment of the present disclosure, can use a probabilistic model to estimate the audience interest distribution and an evaluation framework can be used to evaluate various aspects of the problem. The exemplary model can function using the following exemplary procedures: a) estimate user interest distribution ("UID") from users' web behavior; and/or b) estimate the expected audience interest distribution ("AID") for a website based on the UIDs of the audience.

Figure 2:
FIG. 2 is an exemplary image of the Sports Illustrated website.
Figure 3:
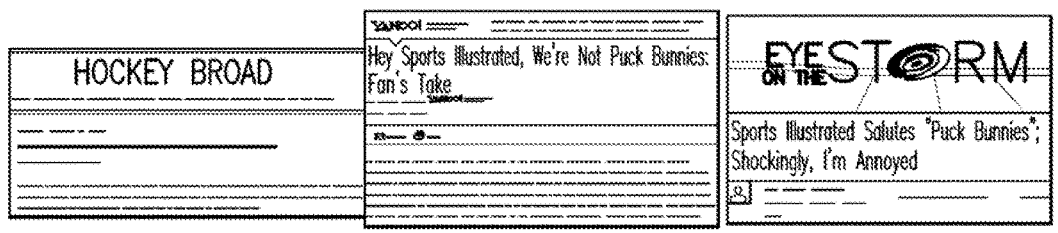
FIG. 3 is a set of exemplary images of other exemplary websites.

For example, a marketer, such as Proctor & Gamble, can plan to start a campaign of its Olay brand. It can hire an advertiser, for example, AudienceMedia to help them execute the advertising campaign. AudienceMedia can find an inventory from the webpage http://www.forumice.com/forumdisplay.php?4-Montreal-Canadiens, whose screen shot is shown in FIG. 1. Based on the contextual content of the webpage (e.g., hockey, sports), their reaction can be to not place the Olay advertisement on the webpage because of lack of association with the brand. However, the exemplary audience interest model can determine that the AID of the aforementioned webpage can contain the following categories: hockey, beauty, and style. The AID output can indicate the potential audience of the webpage for the Olay brand, and AudienceMedia can make the decision to bid for the inventory through ad exchanges, and the exemplary systems, methods and computer-accessible mediums, according to an exemplary embodiment of the present disclosure, can determine that almost half of NHL fans, and visitors to the Sports Illustrated's website, can be women (see, e.g., FIGS. 2 and 3). This example shows one of the advantages of the exemplary AID model according to an exemplary embodiment of the present disclosure, which can provide certain audience insights to website operators and/or advertisers.

An exemplary data-driven model of the exemplary distribution of interests of a website's audience that can take advantage of the increasing availability of massive data on users' online behavior is illustrated below. The audience interest is modeled as distributed across some set of predefined exemplary categories. These exemplary categories are taken as input to the exemplary model, and the exemplary modeling can use that fact that there can exist a "seed" set of labeled websites. Such websites can be labeled by humans, e.g., by text classification methods (see, e.g., Reference 19), or by some combination of the two. (See, e.g., References 15, 2, 24). As will be discussed in detail below, a website's labels can be identified as representing some subset of the interests of the visitors to the websites.

The exemplary model, according to an exemplary embodiment of the present disclosure, can estimate the distribution of audience interests for one website based on massive data about the audience's visitations to other websites. The exemplary generative model can provide a crisp interpretation of audience interest. For example, a UID is the probability (e.g., estimated) that any particular user will visit a website with a certain topic (e.g., category). A site's AID is the expected user interest distribution for a randomly drawn visitor to the site.

Exemplary Estimating the AID From Data can be important for the following reasons.

A. Contextual categorization of websites can be expensive and/or error prone at large scale. More specifically, human (e.g., "manual") categorization can be very expensive and time-consuming, and can simply be unrealistic for large websites, and for applications such as online advertising. Automated classification, for example via text classification and natural language processing, can be error-prone (e.g., accurate for certain categories and types of pages, not so accurate for many others). Commercial systems for contextual classification use a combination of both manual and automated classifications and charge for the service accordingly. The exemplary systems, methods and computer-accessible mediums according to an exemplary embodiment of the present disclosure can facilitate the AID to be used to predict website contextual categories on a massive scale, and with sufficient accuracy.

B. Even under favorable assumptions, contextual categorization can provide only a narrow view of user interests. It can be assumed that users visit a webpage (e.g., website) because their own interests can be aligned with at least some topic represented on the page—this can be an assumption in the exemplary generative model. However, audiences can generally have other interests that may not be directly represented in the contextual categorization. For example, the AID for a particular "hockey" website can show significant audience interest in "style" and "beauty"—possibly unlike other hockey sites. This can be important both to website operators and to advertisers. (e.g., sports magazines have overlooked the fact that almost half of NHL fans can be women).

C. Certain sorts of websites simply do not lend themselves to easy/accurate contextual categorization. Image pages, video pages, fully flash-based pages, social network pages, etc., can be much more difficult than text-based pages to automatically determine the category. Yet, they can have relatively straightforward AID.

For example, it can be assumed that each user's interest distribution is constant during the modeling period. The modeling periods in the exemplary empirical study can be fairly short due to the massive size of associated data. Specifically, if the modeling period is 24 hours, and a user actually shifted from being interested in "football" to being interested in "dining out," the model can consider the user to have a single interest distribution with substantial probabilities on both "football" and "dining out".

The exemplary systems, methods and computer-accessible mediums, according to an exemplary embodiment of the present disclosure, can estimate the user interests of websites. This can be based on massive data of anonymous web users' visitations to websites, extracted from the logs of a major player in the online advertising industry, combined with contextual classifications from one of the leading commercial providers.

A quantitative evaluation can be based on an assumption that a user visits a website because of his/her interest in at least one of the topics (e.g., categories) of the content on the website. This assumption can also be the explicit basis for work on "behavioral targeting." (See, e.g., References 33, 6). Therefore, there can be an overlap between the contextual category distribution ("CCD") of a website (e.g., which can estimated from the content) and the AID (e.g., which is estimated from audience behavior). An exemplary evaluation test can be formatted for predictive modeling research. For example, given a set of contextually labeled websites, the contextual categories for each website can be maintained for the estimation of its own AID. How often the estimated AID for each website is included in the website's actual (e.g., held out) categories can be measured. The results show that the AID can be quite accurate in predicting these known audience interests.

Analyzing some of the discrepancies between AID and CCD, evidence that the exemplary model finds interesting audience interest relationships that may not be evident from the contextual categorization can be found. As one example, a web-page can be given the contextual category of "parenting". However, the reader who is familiar with the webpage might intuit that the audience of this page may not be solely interested in "parenting". Indeed, the model's estimated AID can add categories "beauty," "medicine," and "style".

Finally, following the reasoning in (Eq. 3) below, websites can be examined for which contextual categorization can be expected to be less accurate; in particular, pages from an image-hosting website. The contextual categorizations can be substantially less accurate than that of the text-oriented websites. However, the AID can represent relevant users' interests as evaluated qualitatively by looking at the pictures.

Such exemplary modeling can be "privacy friendly": (i) the exemplary model and modeling does not rely on any knowledge of the identities of the users—they can be anonymized arbitrarily, as long as it is possible to relate multiple website visitations to a single anonymized web user. In addition, no demographics or other user-level data are needed or required to be used; (ii) the exemplary model and modeling does not need to know the content of the websites either, except for the contextual classifications and the estimated AID; and (iii) after the AID is calculated or determined, even the anonymized user visitation data can be disposed of. Unlike behavioral targeting, where a representation of users' interests must be maintained (e.g., anonymously), for conscientious behavioral targeters, AID-based ad targeting does not need to store "profiles" of users.

Exemplary audience Interest Distribution Model

As indicated herein above, a goal is to use behavioral data to estimate the distribution of interests of visitors to websites and webpages.

Figure 4:
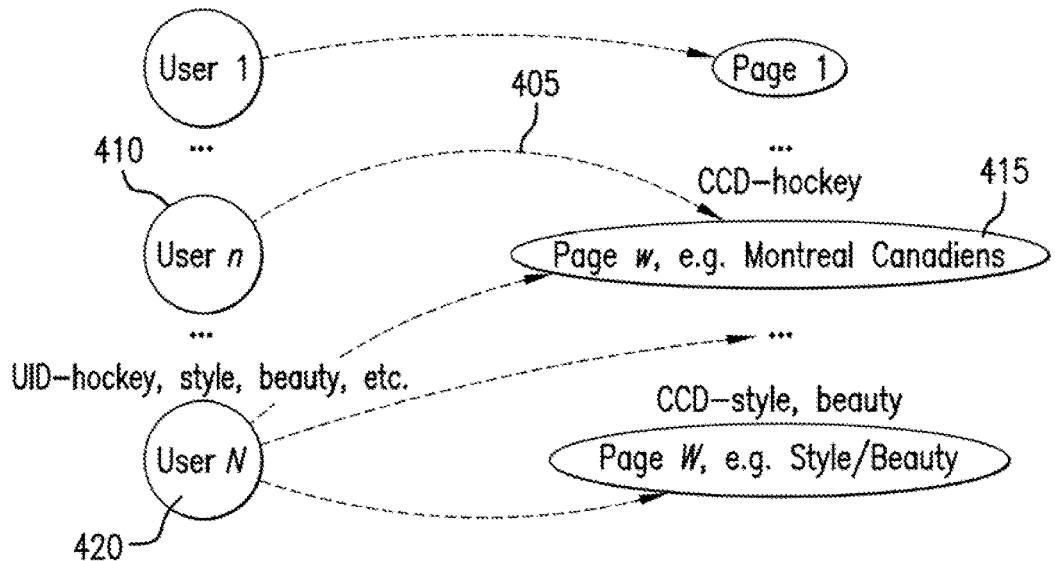
FIG. 4 is a representation of an exemplary user interest model according to an exemplary embodiment of the present disclosure.
Figure 5:
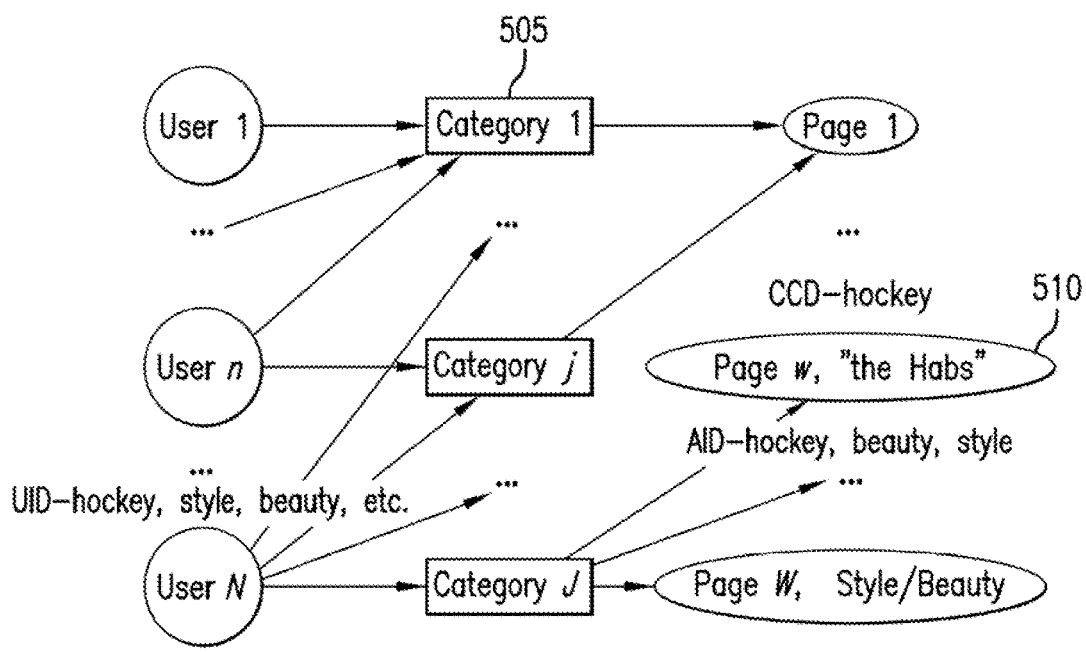
FIG. 5 is a representation of an exemplary audience interest model according to an exemplary embodiment of the present disclosure.

FIG. 4 shows a representation of an exemplary (e.g., collected) web behavior model of users. A dotted line 405 from user 410 to page 415 can indicate that user 410 may have visited page 415 before. "CCD" can represent the topics of a page extracted from its content. "UID" can represent the topics that a user is interested in. Since a user can visit a hockey webpage (e.g., page w) and a style/beauty page (e.g., page W), the user, to some degree, is interested in the three topics (e.g., hockey, style, and beauty). Then, user N's 420 "UID" can include the three topics, reflecting the fact that the user can have an interest in the topics. FIG. 5 illustrates that the audience interests can be calculated for pages. Notice that the pages on the right-hand side can be a different set from the pages from FIG. 4. The rectangular nodes 505 in the middle can represent hidden categories, and is ignored for explanation purposes. If page w 510 is looked at, "the Habs", which is a page about hockey, it is expected that the audience is interested in not only "hockey", but also topics like "beauty" and "style". The reason is that user N, who is one of the visitors to page w, can be interested in "beauty" and "style". This can assist in explaining the reason that AID categories can be seen as "beauty" and "style".

Figure 6:
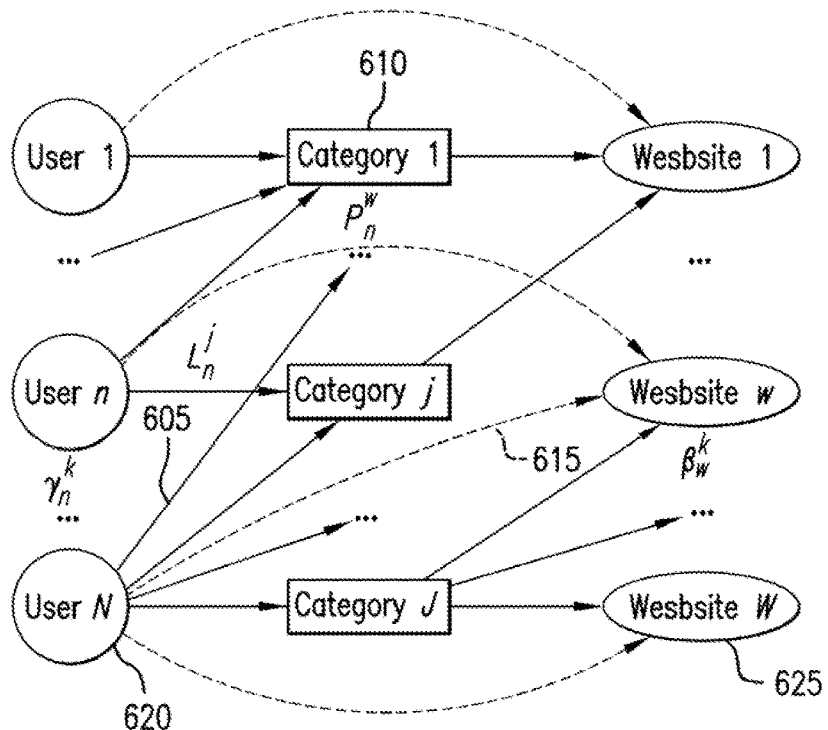
FIG. 6 is a representation of a structure of the exemplary model according to an exemplary embodiment of the present disclosure.

Formally, the exemplary model is a two-stage generative model, the structure of which is illustrated in FIG. 6. The generative nature of the exemplary model is based on the assumption that users' website visitation behavior is generated by user-specific distributions of interest in the different topical interest categories that can be present in websites' content. The category choices generally can be unobserved, and therefore are latent in the exemplary model; these latent choices are represented by the solid lines 605 and the lighter-shaded rectangles 610 in FIG. 6. The observed data are represented by the dotted lines 615 and the darker-shaded ovals 625 and circles 620.

The exemplary "aggregation" stage, or aggregation model, can calculate each website's expected audience interest distribution ($\beta_w^k$) based on: i) known or estimated user interest distributions ($\gamma_n^k$), and ii) users' expected visitation behaviors based on website interest categories (1 . . . K).

The exemplary aggregation model can assume that the user interest distribution is known; they generally may not be known, so they can be inferred from the data. The "inference" stage, or inference model, estimates each user's inherent interest distribution ($\gamma_n^k$) based on users' observed browsing behavior (e.g., indicated by dotted lines 605 from users to websites as shown in FIG. 6).

The exemplary generative model for aggregating a site's audience interests. A detailed generative "aggregation" model is presented below that is the basis for the calculation of AID for sites, based on known or estimated user interest distributions.

For example, there may be N users, W sites/pages, and K interest categories. Each user can have a certain number of web activities (e.g., visiting sites) in the exemplary time frame of evaluation. Each such activity can form a link between a user and a site, and can add to the number of visits between them. The number of links between users 1, . . . , n, . . . , N and all sites by a vector $\vec{L}=\langle L_1, \ldots L_n, \ldots, L_N \rangle$, for example, in total $L_n$ visits can originated from user n to all sites. It is assumed that each user n can have an inherent interest distribution $\vec{\gamma_n}=\langle \gamma_n^1, \ldots, \gamma_n^k, \ldots \gamma_n^K \rangle$, which is a categorical distribution over all possible K categories, with k representing an arbitrary category. Subscripts can be used to indicate the current observed object that is of concern, where, e.g., the dark-shaded ovals and circles as shown in FIG. 6, users are indicated as n, web sites are indicated as w, and superscripts indicate varying elements, for example, categories k for an interest distribution of user n over all categories.

In the exemplary model according to an exemplary embodiment of the present disclosure, the interest distribution for a user n can determine her inherent preferences in particular categories (e.g., category k). Under this exemplary assumption, such preferences can lead to her visiting sites whose content contain such categories. This exemplary probability can be specified by the probability mass function as, for example:

$$Pr(X=k|\vec{\gamma_n}) = \gamma_n^k = \prod_{k=1}^{K} (\gamma_n^k)^{\delta(X=k)}, \quad (1)$$

where $\delta(X=k)$ can be an indicator function where, for example:

$$\delta(X=k) = \begin{cases} 1 & X=k \\ 0 & \text{Otherwise} \end{cases}. \quad (2)$$

TABLE 1

Terminology Table

| Symbol | Representing |
|---|---|
| N | The total number of users. |
| n | Indicating user n. |
| W | The total number of websites. |
| w | Indicating website w. |
| K | The total number of interest categories. |
| k | Indicating interest category k. |
| J | The total number of latent categories (also websites in section 2.1.1). |
| j | Indicating latent category j (also website in section 2.1.1). |

TABLE 1-continued

Terminology Table

| Symbol | Representing |
|---|---|
| $L_n$ | The total number of visits from user n to all categories. |
| $L_n^j$ | The number of visits from user n to category j. |
| X | A random variable with various meanings depending on the context. |
| $\gamma_n^k$ or $\gamma_n^j$ | User n's interest distribution, over category k or j. |
| Γ | The N by K matrix representing user interest distributions for all users. |
| $\vec{\delta}_j$ | The expected audience interest distribution (AID) for category/site j in section 2.1.1. |
| $\phi_j^w$ | The probability of a user's visits to category j being redirected to site w. |
| $\eta_n^w$ | The probability of user n visiting site w. |
| $P_n$ | The total number of visits from user n to all sites. |
| $P_n^w$ | The number of visits from user n to site w. |
| $\beta_w^k$ | The expected audience interest distribution (AID) for site w. |
| B | The W by K matrix representing audience interest distributions across all websites. |
| $\Psi_w^j$ | The probability for website w to receive users' visits redirected from category j. |
| Z | A normalizing factor with different forms in different contexts. |
| AID | Shortened form of Audience Interest Distribution (for a website) |
| CCD | Shortened form of Contextual Category Distribution (for a website) |
| UID | Shortened form of User Interest Distribution (for a user) |

For example, $\Sigma_{k=1}^{K}\gamma_n^k=1$, which can make the distribution a proper probability distribution, and which is used for a coherent interpretation of the audience interest distributions.

In the exemplary model according to an exemplary embodiment of the present disclosure, each of the N users can have their own interest distribution $\vec{\gamma}_n$, thus, as a whole, the set of interest distributions for all users can be represented as a N by K matrix Γ, where, for example $$\Gamma = \begin{bmatrix} \gamma_1^1 & \cdots & \gamma_1^K \\ \vdots & \ddots & \vdots \\ \gamma_N^1 & \cdots & \gamma_N^K \end{bmatrix}, \quad (3)$$

with each row vector representing user n's interest distribution, and each column representing each category's audience interest component across all users. The column vectors can be denoted as $\vec{P}_k = \langle \gamma_1^k, \ldots, \gamma_n^k, \ldots, \gamma_N^k \rangle$.

Exemplary Single Category Per Site, Single Site Per Category

To simplify the presentation of the exemplary model, it is assumed that each site can contain only one category of content, and each category only belongs to one site. These exemplary constraints can be relaxed, however. In this exemplary case, the sites are presented by the categories, which can be 1, ..., j, ..., J, where J=K, the total number of categories.

The number of visits from user n to all sites can be modeled as a multinomial distribution on counts Scalar $L_n$, which are the total number of visits that user n pays to all sites as defined above. Random variable $X_n^j$ can be the number of visits from user n to category j (e.g., in this case, also site j), and $\gamma_n^j$ can be the probability of user n visiting category j as defined above. Then, the probability of J user n having $L_n^1, \ldots, L_n^j, \ldots, L_n^J$, ($L_n = \Sigma_{j=1}^{J} L_n^j$) visits can be the probability mass function where, for example:

$$Pr(X_n^1 = L_n^1, X_n^2 = L_n^2, \ldots, X_n^J = L_n^J | L_n, \vec{\gamma}_n) = \quad (4)$$

$$\frac{L_n!}{L_n^1! \ldots L_n^J!} \prod_{j=1}^{J} (\gamma_n^j)^{L_n^j}.$$

From the properties of multinomial distribution (see, e.g., Reference 30), the expected number of visits from user n to category (e.g., site) j can be, for example:

$$EX_n^j = L_n \gamma_n^j. \quad (5)$$

Thus, in an exemplary expectation, site j receives $L_1 \gamma_1^j$ visits from the user with interest distribution $\vec{\gamma}_1$ and $L_N \gamma_N^j$ visits from the user with interest distribution $\vec{\gamma}_N$.

The AID $\vec{\delta}_j$ for site j is calculated by taking the weighted mean of all user interest distributions where, for example:

$$\vec{\delta}_j = \frac{1}{Z} \sum_{n=1}^{N} L_n \gamma_n^j \langle \gamma_n^1, \ldots, \gamma_n^k, \ldots, \gamma_n^K \rangle \quad (6)$$

$$= \frac{1}{Z} \left\langle \sum_{n=1}^{N} L_n \gamma_n^j \gamma_n^1, \ldots, \sum_{n=1}^{N} L_n \gamma_n^j \gamma_n^K \right\rangle,$$

where Z can be the usual normalizing factor. Recall that $\vec{P}_k = \langle \gamma_1^k, \ldots, \gamma_n^k, \ldots, \gamma_N^k \rangle$ can be the column vector for category k of the user interest distribution matrix Γ. Observe that $\vec{P}_1^T \cdot \vec{P}_h = \Sigma_{n=1}^{N} \gamma_n^i \gamma_n^{h7}$, where, for example:

$$\vec{\delta}_j = \frac{1}{Z} \left\langle (\vec{L} \circ \vec{\rho}_j)^T \cdot \vec{\rho}_1, \ldots, (\vec{L} \circ \vec{\rho}_j)^T \cdot \vec{\rho}_K \right\rangle = \frac{1}{Z} (\vec{L} \circ \vec{\rho}_j)^T \cdot \Gamma, \quad (7)$$

where ∘ can be the Hadamard product. Equation 7 can show that AID can amend the original audience interest distribution matrix Γ by aggregating each user's visitation factor $\vec{L}$ and category (j) specific information $\vec{P}_j$.

Thus, the AID $\vec{\delta}_j$ can represent the expected interest distribution across all users that visit the site. For site j, each element of the AID vector $\vec{\delta}_j = \langle \delta_j^1, \ldots, \delta_j^k, \ldots, \delta_j^K \rangle$ can represent the aggregated audience interest probability for each specific category. All the interest distributions across all sites can comprise a J by K matrix Δ, where, for example:

$$\Delta = \begin{bmatrix} \delta_1^1 & \cdots & \delta_1^K \\ \vdots & \ddots & \vdots \\ \delta_J^1 & \cdots & \delta_J^K \end{bmatrix}, \quad (8)$$

where J can be the number of sites (in this restricted setting, also the number of categories) that the users have visited, which in this case can be K. J can be used to distinguish it from the row count K because they might be different. Element $\delta_j^k$ of the matrix Δ can be, for example:

$$\delta_j^k = \frac{1}{Z} \sum_{n=1}^{N} L_n \gamma_n^j \gamma_n^k. \quad (9)$$

EXEMPLARY PROPOSITION 1. $\vec{\delta}_j$ can be the expected interest distribution of a randomly drawn visitor to website (in this case also category) j.

The exemplary expected number of visits from user n to site j can be $EX_j = L_n \gamma_n^j$. In other words, in expectation, user n with interest distribution $\vec{\gamma}_n$ visits site j $L_n \gamma_n^j$ times. If a user is randomly drawn from all the visitors of site j, with probability $$\frac{L_n \gamma_n^j}{Z},$$

user n with interest distribution $\vec{\gamma}_n$ can be drawn. Here $Z = \Sigma_n L_n \gamma_n^j$ can be the normalizing factor. Averaging over all users, the expected interest distribution of a randomly draw visitor to site j can be, for example:

$$\vec{\delta}_j = \sum_{n=1}^{N} \frac{1}{Z} L_n \gamma_n^j \langle \gamma_n^1, \ldots, \gamma_n^k, \ldots, \gamma_n^K \rangle, \tag{10}$$

Exemplary Multiple Sites per Category, Single Category per Site

The above description assumes that each category belongs to only one site. A slightly less simplified scenario is where each category can belong to multiple sites, but each site contains only one category. Modeling this exemplary scenario is a straightforward extension to the previous exemplary model. If the only extension to the exemplary model is that a category can belong to multiple sites, then in terms of the audience interest distributions there is nothing to differentiate various sites from each other within each category. If two sites are in the same category, then users' interest distributions are the same for these two sites (e.g., they can be "carried over" from that category). Equation 7 can be extended following this observation that each category carries its own AID regardless of the sites it belongs to. Additional exemplary extensions to this exemplary model are possible.

Exemplary Multiple Sites per Category, Multiple Categories per Site

Figure 7:
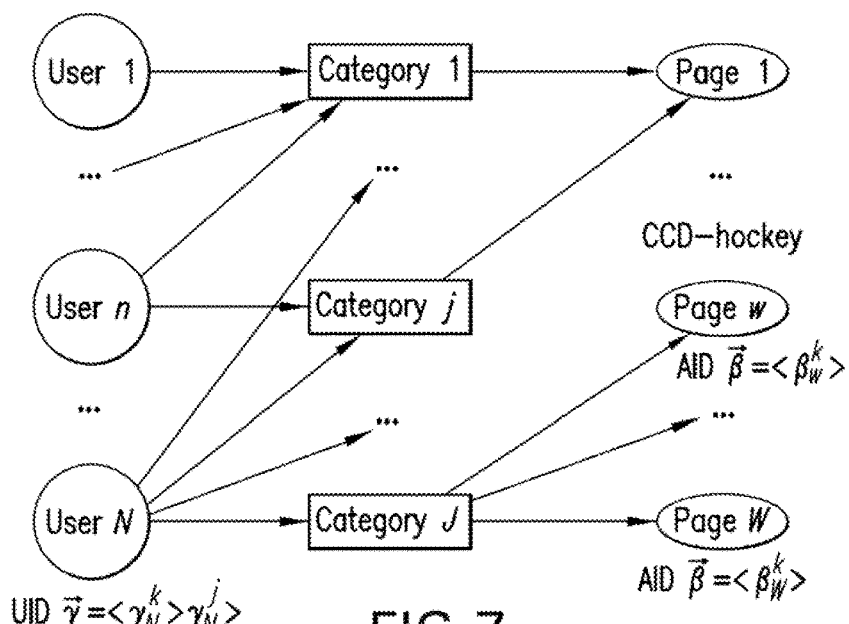
FIG. 7 is a representation of the structure of the exemplary aggregation model according to an exemplary embodiment of the present disclosure.

The exemplary aggregation model according to an exemplary embodiment of the present disclosure can be extended to the situation where there is a many-to-many mapping between sites and categories. The exemplary generative process is that to take an action, each user (e.g., with $\vec{\gamma}_n$) can draw a category j that can determine his or her visitation, based on the multinomial distribution in equation 1. As indicated herein above, e.g., a site is drawn at the same time, because of the assumed 1-to-1 mapping between sites and categories. However, the category is drawn first, and then a site w is drawn, taking into account the W-to-K mapping. The aggregation stage of the exemplary model is depicted in FIG. 7.

An exemplary distribution is assigned across all sites within category j, representing the probability of drawing site w from category j. For category j, $\vec{\phi}_j = \langle \phi_j^1 \ldots \phi_j^W \rangle$ can denote the categorical distribution—just as in equation 1, except where each element $\phi_j^w$ can be the probability of a user's visits to category j being redirected to site w. Note that $\Sigma_w \phi_j^w = 1$. It is assumed that the categorical distribution $\vec{\phi}_j$ is known to the model; it could be obtained based on different assumptions and different interpretations of the data. One exemplary solution is to assume a uniform distribution that assigns equal probabilities to all sites within category j. An exemplary alternative is to assign higher probabilities to more popular sites. A third exemplary way is to assign smaller probabilities to sites that have a larger number of contextual categories. How the distribution is arrived at may not be important for the present theoretical model development. As indicated herein below, a uniform distribution is assumed, as the results are less influenced by the experimenters' choice.

For example, a final step in building a practically useful aggregation model is to compose direct links from each user n to site w, since in the data, the intermediate category choice is unobserved. Each user n is associated with a categorical distribution $\vec{\eta}_n = \langle \eta_n^1 \ldots \eta_n^W \rangle$, where each element $\eta_n^w$ can denote the probability of user n visiting site w. $X_n^w$ can be the random variable representing the number of visits from user n to site w. In this exemplary case, the distribution of $X_n^w$ taking values $P_n^w$ can be an multinomial distribution where, for example:

$$Pr(X_n^1 = P_n^1, \ldots, X_n^W = P_n^W \mid \vec{\eta}_n, P_n) = \frac{P_n!}{P_n^1! \ldots P_n^W!} \prod_{w=1}^{W} (\eta_n^w)^{P_n^w}, \tag{11}$$

where the total number of outbound visits from user n to all sites can be denoted by scalar $P_n$ and individual number of visits from user n to site w by scalar $P_n^w$. Note that $\Sigma_w P_n^w = P_n$.

The exemplary generative model can draw a visit from user n to website w by first drawing a visit from user n to category j based on user interest distribution $\gamma_n^j$, then draw website w based on $\phi_j^w$ as described above. It is assumed that the probability of drawing a visit from category j to site w does not depend on previous events (e.g., where the visit to category j was originally from)—the phase drawing websites from categories are modeled to be independent of the phase of drawing categories for users.

Thus, the exemplary probability of user n visiting site w ($\eta_n^w$) is, for example:

$$\eta_n^w = \sum_j Pr(\text{from } n \text{ to } j) * Pr(\text{from } j \text{ to } w \mid \text{from } n \text{ to } j) \tag{12}$$

$$= \sum_j Pr(\text{from } n \text{ to } j) * Pr(\text{from } j \text{ to } w) \tag{13}$$

$$= \sum_{j=1}^{J} \gamma_n^j \phi_j^w.$$

EXEMPLARY PROPOSITION 2. $\eta_n^w$ (calculated through equation 13) can be a proper probability distribution.

When $\Sigma_w \phi_j^w = 1$ and $\Sigma_j \gamma_n^j = 1$, then, for example:

$$\sum_w \eta_n^w = \sum_w \sum_j \gamma_n^j \phi_j^w \tag{14}$$

$$= \sum_j \sum_w \gamma_n^j \phi_j^w$$

-continued $$= \sum_j \gamma_n^j \sum_w \phi_j^w$$

$$= \sum_j \gamma_n^j$$

$$= 1.$$

Therefore, for each user n, $\eta_n^w$ over all sites w can be a proper categorical distribution.

Given the multinomial distribution based on $\vec{\eta}_n$ and $P_n$ as in equation 11, the expected number of visits from user n to site w can be, for example:

$$EX_n^w = P_n \eta_n^w. \quad (15)$$

Therefore, in an exemplary expectation, site w received $P_n \eta_n^w$ visits from user n. In order to obtain the expected audience interest distribution $\beta_w$ for site w, the expectation of interest distributions can be taken from all users who visit site w, and treat $L_n \eta_n^w$ as the averaging weight where, for example:

$$\vec{\beta}_w = \frac{1}{Z} \sum_{n=1}^N P_n \eta_n^w \cdot \vec{\gamma}_n \quad (16)$$

$$= \frac{1}{Z} \left( \sum_{n=1}^N P_n \eta_n^w \gamma_n^1, \dots, \sum_{n=1}^N P_n \eta_n^w \gamma_n^k, \dots, \sum_{n=1}^N P_n \eta_n^w \gamma_n^K \right). \quad (17)$$

The AID across all sites can include a W-by-K matrix B, where each element of the matrix can be, for example:

$$\beta_w^k = \frac{1}{Z} \sum_n P_n \eta_n^w \gamma_n^k = \frac{1}{Z} \sum_n \left\{ P_n \gamma_n^k \left( \sum_j \gamma_n^j \phi_j^w \right) \right\}. \quad (18)$$

$\vec{\beta}_w$ can be the aggregated AID for site w. $\vec{\beta}_w$ can have the following meaning: across all visits to site w, one visit is randomly drawn, the expected interest distribution of the unknown visitor who pays this visit can be $\vec{\beta}_w$.

EXEMPLARY PROPOSITION 3. $\vec{\beta}_w$ can be the expected interest distribution of a randomly drawn visitor to website w.

It is known that the expected number of visits from user n to site w is $EX_n^w = P_n \eta_n^w$. In expectation, user n with interest distribution $\vec{\gamma}_n$ visits site w $P_n \eta_n^w$ times. If a user is randomly drawn from all the visitors of site w, with probability $$\frac{P_n \eta_n^w}{Z}$$

user n with interest distribution $\vec{\gamma}_n$ can be drawn. Here $Z = \sum_n P_n P_n^w$ can be the normalizing factor. Take the expectation over all users 1 . . . N, the expected interest distribution of a drawn visitor to site w can be, for example:

$$\vec{\beta}_w = \sum_{n=1}^N \left( \frac{1}{Z} P_n \eta_n^w \cdot \vec{\gamma}_n \right). \quad (19)$$

Exemplary Generative Model for Inferring User Interests

As indicated herein above, the exemplary aggregation model can assume that the user interest distributions $\gamma_n^j$ is known. In general, this may not be known. This can lead to a further stage of the exemplary model: inferring $\gamma_n^j$ from the data. The inference is based on a generative model similar to the exemplary generative aggregation model presented above. In the exemplary aggregation model, it is assumed that all users' interest distributions $\Gamma$ can be known, and the aggregation model can be utilized to obtain the expected audience interest distribution for each website. In the exemplary inference model(s) described here, the visits from users to websites are modeled probabilistically, and use all known information to infer the best $\Gamma$ (e.g., the best individual user interest distribution $\vec{\gamma}_n$ for user n).

An exemplary goal is to infer parameters of the exemplary model, $\Gamma$, from site visitation data where the contextual categories of the sites are observed. The contextual category distribution ("CCD") of a site may not be the same as the audience interest distribution of a site. Everyone who comes to a particular Golf site can be very interested in Finance (e.g., Finance is strongly represented in the site's AID), although the site may only talk about Golf (e.g., Finance may not be in the site's CCD). Ultimately, the AID is of interest. The CCD is used to bootstrap the process by inferring $\Gamma$. Then, $\Gamma$ is used to calculate the AID using the aggregation model described above.

The exemplary generative model for visits from user n to web site w can be as follows. As in the exemplary aggregation stage, a visit is drawn from user n to category j from a multinomial distribution multi($\gamma_n^j$, $L_n$), where $\gamma_n^j$ can be the probability of visiting category j from user n, which is a UID. Visits are drawn in this way until the total number of visits $L_n$ are reached. For each of the visits to category j, a draw of visits to site w is conducted based on a multinomial distribution multi($\phi_j^w$, $V_j$), where $\phi_j^w$ can be the probability of visiting site w from category j, and $V_j$ can be the total number of visits that category j receives from all users and pays to all web sites. While $\gamma_n^j$ can have the clear meaning of a user's interest distribution, $\phi_j^w$ is not to be confused with $\vec{\delta}_j$, the aggregated audience interest distribution for category j. $\phi_j^w$ can represent the importance of site w within category j.

Exemplary Inference: Single Category Per Site, Single Site Per Category

As with the exemplary aggregation model, the simple case is where each site can only have one category, and each category can only have one site. It is assumed that website visitation behavior is observed by, for example, a bipartite graph formed by users' visitations to websites. In the exemplary case, the users' visitations are modeled to categories, which is equivalent to websites. If sites can each have only one category, multiple sites per category can treat category j as a "supernode" where all sites with category j cluster together.

For user n, it is known that, from the bipartite graph described above that, the total number of visits $L_n$ as well as the number of visits to individual categories j can be $L_n^j$. One alternative for inferring $\Gamma$ is to use the maximum likelihood estimator ("MLE") of $\gamma_n^j$ where, for example:

$$(\gamma_n^j)^{MLE} = \frac{L_n^j}{L_n}. \quad (20)$$

The MLE estimator is used, e.g., as a starting point to build the exemplary aggregation model. Note that in this case, $L_n^j$ can be the number of visits from user n to category j, which is assumed to be observed for the moment because of the simplifying assumption. In this case j=k, because the category-to-website mapping is a one-to-one mapping. Therefore, $\gamma_n^j$ can be written as $\gamma_n^k$.

In the exemplary case that a non-uniform visitation distribution over categories can create a data sparsity problem, a smoothing factor can be used, such as, for example:

$$(\gamma_n^j)^{\widehat{MLE}} = \frac{L_n^j + \mu_j}{L_n + \sum_j \mu_j}, \quad (21)$$

where $\vec{\mu} = \langle \mu_j \rangle$ can be the vector of Dirichlet priors representing prior knowledge about the interest distribution across categories.

Figure 8:
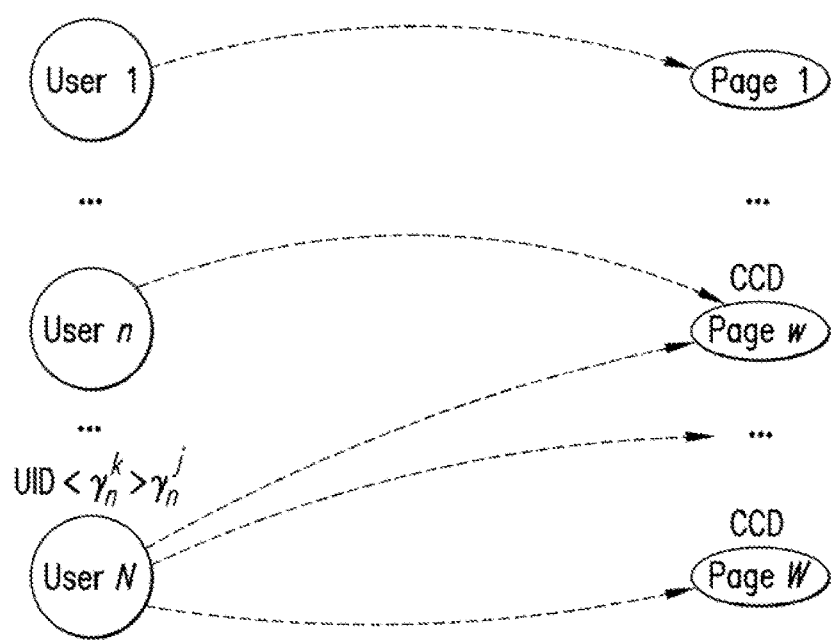
FIG. 8 is an exemplary representation of the structure of the exemplary interference model according to an exemplary embodiment of the present disclosure.

In practice, there are many sites that can have any particular category, and each site can have multiple categories. The inference stage of the exemplary model is depicted in FIG. 8. Thus, the visitations to individual categories may not be observed, so the inference from above may not be employed. $\gamma_n^j$ can be inferred from everything that is not known in the dataset. The MLE equation above is used to calculate, for example:

$$(\gamma_n^j)^{MLE} = \frac{L_n^j}{L_n}. \quad (22)$$

$L_n$ can be the total number of visits (e.g., draws) from user n to all categories, and therefore the total number of visits to all sites; $L_n$ can be calculated from the known dataset (e.g., users' visitations to websites). The number of visits from user n to website w, $P_n^w$ is known. However, $L_n^j$—the number of draws of category j—may not be known, and can be estimated based on $L_n$ and $P_n^w$.

It is assumed that $\psi_w^j$ is known, which can represent the probability for website w to receive users' visits redirected from category j. In other words, $\psi_w^j$ can show the importance of category j for website w. Note that $\Sigma_j \psi_w^j = 1$. For website w, $\psi_w^j$ may be modeled as a uniform distribution, which can assign each weight to all categories. $\psi_w^j$, may instead be estimated through contextual analysis methods (e.g., text mining, natural language processing). For example, finance related websites can have a higher $\psi_w^j$ in category "j=Finance" than in category "j=News" because its content contains more information indicative of the category "Finance" rather than "News". In the exemplary experiments below, a proxy measurement is employed for $\psi j$—the website-specific contextual scores across all categories, obtained from an industry-leading contextual classification company specialized in applying semantics technology and Natural Language Processing procedures to website content. This is a convenient and reasonable proxy, as the contextual website classifications (e.g., the CCD) is needed to bootstrap the model, and thus, this proxy may not introduce an extra estimation.

An important property of the exemplary model is that $\psi_w^j$ is specific to website w, and is independent of the events of any user visiting the website. As indicated herein above, $\psi_w^j$ can represent the probability for website w to receive visits from categories. Thus, across all the visits website w receives from user n, the probability that a visit can come from category j can be $\psi_w^j$. A model of the visits that website w can receive from user n can be a multinomial distribution multi($\psi_w^j$, $P_n^w$), similar to the exemplary models described above. Among all the visits originated from n to w, the expected number of visits from category j to website w can be $P_n^w \psi_w^j$. The number of visits from user n to category j—$L_n$ can be calculated by summing over all websites who receive visits: i) originating from user n; and/or ii) can be from category j to each site w, which can be, for example:

$$L_n^j = \sum_{w=1}^{W} P_n^w \psi_w^j. \quad (23)$$

EXEMPLARY PROPOSITION 4. In the calculation of $L_n^j$, $P_n = L_n$. $\Sigma_j \psi_w^j = 1$. Therefore, for example:

$$\begin{aligned}
L_n &= \sum_j L_n^j \\
&= \sum_j \sum_w P_n^w \psi_w^j \\
&= \sum_w \sum_j P_n^w \psi_w^j \\
&= \sum_w P_n^w \sum_j \psi_w^j \\
&= \sum_w P_n^w \\
&= P_n.
\end{aligned} \quad (24)$$

The exemplary result can show the user n's total number of visits to all categories ($L_n$) can be the same as users n's total number of visits to all websites ($P_n$). Thus the exemplary estimation can pass the correctness check.

Further, combined with equation 19, $\gamma_n^j$, the user interest distribution can be estimated from the data by, for example:

$$(\gamma_n^j)^{\widehat{MLE}} = \frac{\sum_{w=1}^{W} P_n^w \psi_w^j}{L_n}. \quad (25)$$

Exemplary Empirical Study

As indicated herein above, the validity of the exemplary model according to an exemplary embodiment of the present disclosure is evaluated based on its ability to predict known audience interests of selected websites. The exemplary design of the exemplary experiment is straightforward, but is slightly different from the usual predictive modeling experiment. The basis for the exemplary experiment is the natural, and common sense, assumption that a user visits a website because of her interest in at least one of the topics of the content on the website. Therefore, there should be an overlap between the CCD of each webpage and the webpage's AID. As described in detail below, a set of labeled webpages is taken and split into a "seed" set and a "holdout" set. The CCD from the seed set is used in the inference phase, to estimate Γ (e.g., users' interest distribution), and the CCD from the holdout set is hidden from the inference model. This prohibits the holdout pages' own categories from being used to estimate Γ, and thereby prohibits them from being used in the aggregation phase to estimate any AID—including their own. Thus, in the exemplary study, the contextual categories from a webpage may not be used in the estimation of its own AID.

Exemplary Data

The data for the experiment can include (a) a set of webpages spanning a wide variety of contextual categories, labeled with high-quality granular contextual categories, (b) a set of users who visit these webpages, and (c) a set of visits from the users to the webpages. These webpages are commonly visited pages scattered about the web. The data include visits to a large portion of ad-supported webpages; however, the visits may only be a sample of all visits to any given webpage and only a part of all visits from any given user.

Contextually classified categories can be obtained from one of the leading commercial providers. The pages can be sampled for crawling and classification from real ad-delivery traffic, and weighted by frequency of occurrence, so that more frequently visited pages are more likely to be labeled.

For example, all users who visited at least two of these labeled pages are extracted, as users who visit only one page can make no difference in the holdout-based application of the model, as will become clear below. Collecting such data can utilize tremendous data processing infrastructure, because very large number of visits needs to be filtered to select the visits to these specific pages.

Users can be defined by a combination of IP address and HTTP User Agent, including browser type and browser configuration, based on industry best practices, which have been shown to be reasonably accurate at singling out individual users. (See, e.g., Reference 11). IP address and User Agent can be converted using one-way hash functions both for convenience of use and to completely anonymize users. In addition, a procedure can be applied to identify and filter out activities which most likely cannot be attributed to an individual user. These can include requests from IP addresses identified as hotspots or sources of server, as opposed to browser, requests as well as from user agents identified as robots, automated tools or those conducting malicious activities.

The exemplary result of these processes is a bipartite graph between users and webpages, with the size and richness of connectivity, and effort needed to construct, depending on the time frame, and the number of labeled webpages. As described below, the disjoint datasets is referred to by the time frame (e.g., 1-hour, 10-hour). The data to be processed can be massive. For the longest (e.g., 10-hour) timeframe, the original log had 174 million webpages, 50 million users and 483 million visits between users and webpages. The pre-filtered and extracted 10-hour dataset had 18 million users, 28 million webpages and 78 million visits. After the initial preprocessing described above, 11 million (e.g., 11,341,559) users, 14 million (e.g., 14,862,910) webpages, and 45 million (e.g., 45,602,914) visits remain in the 10-hour dataset. All the following exemplary experiments are based on this 10-hour dataset unless mentioned otherwise.

Exemplary Holdout Design

In order to assess whether the exemplary model can estimate the interests of visitors well enough, in the spirit of a "holdout" evaluation, an experimental design can be setup, where no category information from a webpage w can propagate back to itself. Considering the structure of the model, this can be achieved by randomly splitting the experimental dataset in half based on links in the bipartite graph (e.g., between users and webpages). For example, a link between a user and a webpage is used either for inferring the user's UID ($\gamma_n^j$) in the inference phase, or for estimating the site's AID ($\beta_w^k$) in the aggregation phase. In no case can webpage w's AID be estimated using any information in Γ that originated from website w. After randomly splitting the bipartite graph between users and webpages in half, the graphs used in the aggregation and inference phase are denoted as the aggregation graph and the inference graph, respectively. The exemplary AID is calculated or otherwise determined for every webpage w based on the users whose connections to w are in the aggregation graph; these users' γ's are estimated using the inference model based on the contextual categories of webpages in the inference graph and users' visits to the webpages in the inference graph. For example, there can be three hundred and one contextual categories, and each page can have on average only 2 categories, so this task is far from trivial.

If a website/webpage is the only page with a particular category, then the AID may never include this page's category. More generally, if users only visit one particular webpage in each category, the webpages' AID Γ may never include their own categories. It can, therefore, be desirable that a significant portion of users have diverse and sufficiently dense navigation patterns, thus in the exemplary procedure for extracting data, all users visit at least two pages and all pages are visited by at least two users.

The resultant bipartite graph with labeled webpages can include about 1,017,547 visits, 186,691 users, and 36,876 webpages, which can then be split into an inference graph (e.g., 508,718 visits, 181,832 users and 33,347 webpages) and an aggregation graph (e.g., 508,829 visits, 181,744 users and 33,301 webpages).

Figure 9A:
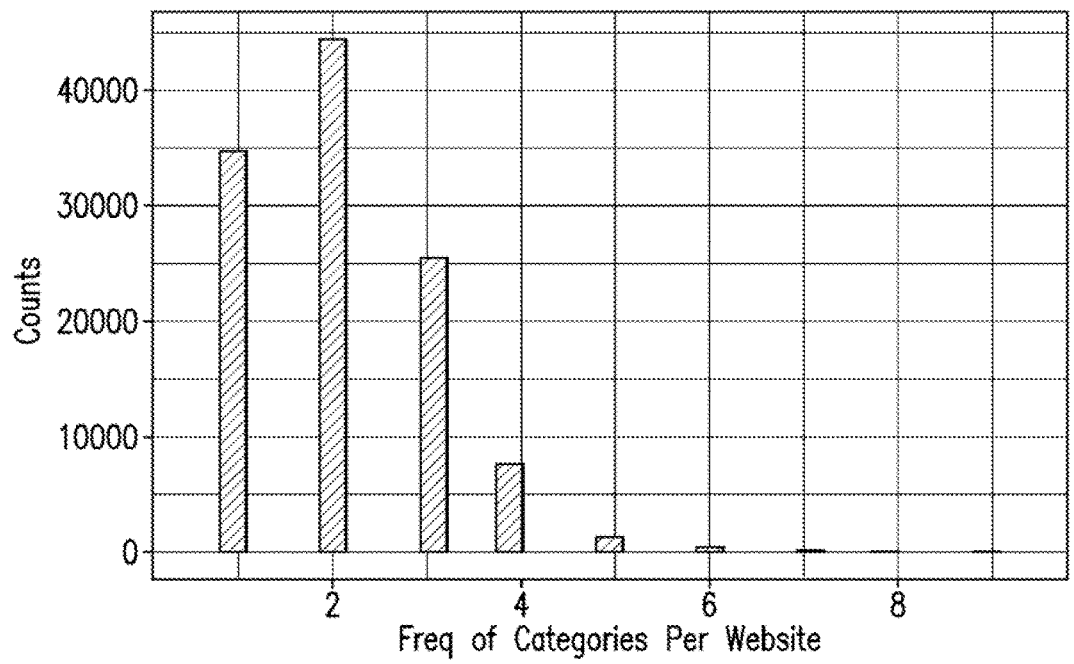
FIG. 9A is a graph illustrating an exemplary histogram of a number of categories per webpage according to an exemplary embodiment of the present disclosure.
Figure 9B:
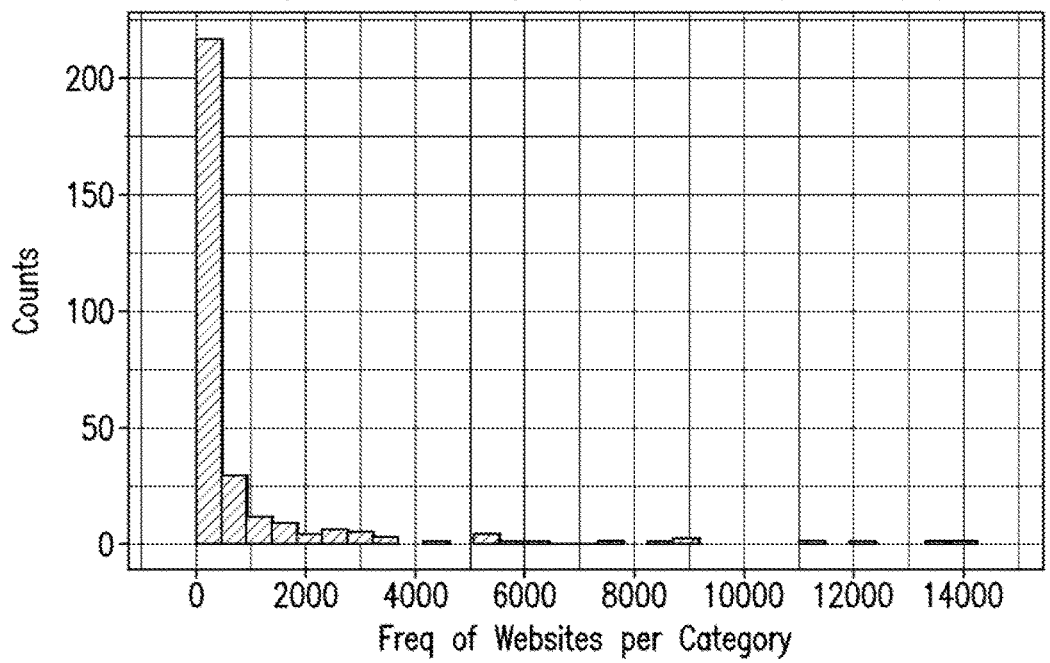
FIG. 9B is a graph illustrating an exemplary histogram of a number of webpages per category.

The top five exemplary contextual categories, in terms of numbers of occurrences in unique webpages, are shown in table 2 below. The histogram of numbers of categories per webpage, and the histogram of numbers of webpages per category are shown in FIG. 9A and FIG. 9B, respectively. From FIG. 9B, it can be seen that a small number of categories can be present in a large number of webpages. This is relevant to the analysis of a photo sharing website.

TABLE 2

Top Five Categories by Numbers of Webpages

| Contextual Category | Number of Unique Webpages |
| --- | --- |
| music | 13780 |
| software | 13629 |
| social science | 12009 |
| books and literature | 11119 |
| legal issues | 9170 |

Exemplary Model Implementation Details

Because of the holdout structure for the experimental evaluation, the full original connectivity between users and pages after the data has split may not be known. While using the exemplary aggregation model above to calculate $\vec{\beta}_w$ for each webpage, the graph structure of the aggregation data is taken into account. Only if there exists a link between a user and a webpage, can the expectation of the number of visits from the user to the webpage be calculated. If webpage w does not exist in the specific aggregation graph being focused on, then $\vec{\beta}_w$ should not exist even though it can be calculated. If there is no link between user n and webpage w in the aggregation graph, the aggregation model based on $\eta_n^w$ may not exist even though it can be calculated through. In order to represent the graph structure, a link indicator $\theta_n^w=\{1,0\}$ is introduced, which can represent the existence of a link between user n and webpage w. Then $\beta_w^k$ can be modified to be, for example:

$$\beta_w^k = \frac{1}{Z}\sum_n L_n \theta_n^w \eta_n^w \gamma_n^k. \qquad (26)$$

Subsequent steps to calculate $\vec{\beta}_w$ can be the same as above. $\vec{\beta}_w$ can still be the expected interest distribution of a randomly drawn visitor to webpage w based on the user-webpage visitation graph structure.

Exemplary Results: Predicting Known Interests

As described above, for each webpage, the exemplary holdout evaluation framework can exclude a webpage's own contextual categories from the model, and can then use the model to predict the webpage's audience interests. Based on this exemplary framework, known category data is used to evaluate how well the exemplary model can predict audience interests. For example, it is assumed that a user visits a webpage because of her interest in at least one of the topics (e.g., categories) of the content on the webpage. Therefore there should be an overlap of at least one category between the CCD of a website and the AID. Given the set of contextual category labels for a webpage w, the overlap between the interests estimated by the AID and the category labels are examined. The notion of a good prediction having at least one category overlap does not penalize the AID for including interests that visitors often have, but that may not be represented in the context (e.g., hockey fans interested in "style"), and does not penalize the CCD for including contextually extracted categories that may not be the subject of visitors' particular interests (e.g., a hockey story commenting on the food variety in a particular arena). The evaluation, however, does penalize the model if the AID categories do not contain any of the CCD categories.

In order to assess the exemplary model's predictive ability, an evaluation measure is used that can capture the overlap. The AID interest vector $\vec{\beta}_w$ can give the estimated interest distribution over the categories. Applying an exemplary threshold τ to the probabilities in $\vec{\beta}_w$ and choosing the categories with $\vec{\beta}_{w\leq\tau}^k$ can give us the set of predicted categories for w, the set {AID}. The exemplary threshold τ can represent the level of interest that is utilized in order to predict the interest; technically, based on the model it can use the fact that an expectation is that a visitor to w can choose to visit a site with category k with greater than probability τ. All contextual categories are used as the CCD set: call it {CCD}. The set of exemplary AID categories {AID} is referred to simply by "AID", and to {CCD} by "CCD".

Whether the AID can predict at least one of the CCD categories can be measured. Consider an adapted version of recall, commonly used to judge the quality of query results in information retrieval. Consider the Kronecker delta function using the Iversion Bracket, which can be written as, for example:

$$\delta(i) = \begin{cases} 0, & \text{if } i \neq 0 \\ 1, & \text{if } i = 0 \end{cases} \qquad (27)$$

For example, Kronecker recall can be defined as follows, for example:

$$1-\delta(|\{AID\}\cap\{CCD\}|). \qquad (28)$$

Kronecker recall can be 1 if there is at least one common category between AID and CCD; it can be 0 if no categories in AID are in the CCD. This is contrasted with "regular" recall, which in this case is the fraction of CCD categories that is successfully predicted, or, for example, can be in the AID:

$$\frac{|\{AID\}\cap\{CCD\}|}{|\{CDD\}|}. \qquad (29)$$

As with the exemplary predictive modeling, Kronecker recall, and regular recall, may not give a full picture of predictive ability. If the exemplary model simply predicted all categories for all pages, Kronecker recall, and regular recall, is perfect, but the model can actually be uninformative. Therefore, as with exemplary predictive modeling evaluations, the precision of the AID-to-CCD category predictions can also be examined. Precision in this context is the fraction of the predicted AID categories that can also appear as CCD categories where, for example:

$$\frac{|\{AID\}\cap\{CCD\}|}{|\{AID\}|}. \qquad (30)$$

Thus, e.g., if all AID categories can actually be in the CCD, then the precision can be 1.0. If the model is to simply predict all categories for all websites, then the precision is very low, considering the very large total number of categories. Both precision and Kronecker recall can measure prediction accuracy for each individual webpage; these then can be averaged over the full set of sites, yielding average precision and average Kronecker recall.

Figure 10A:
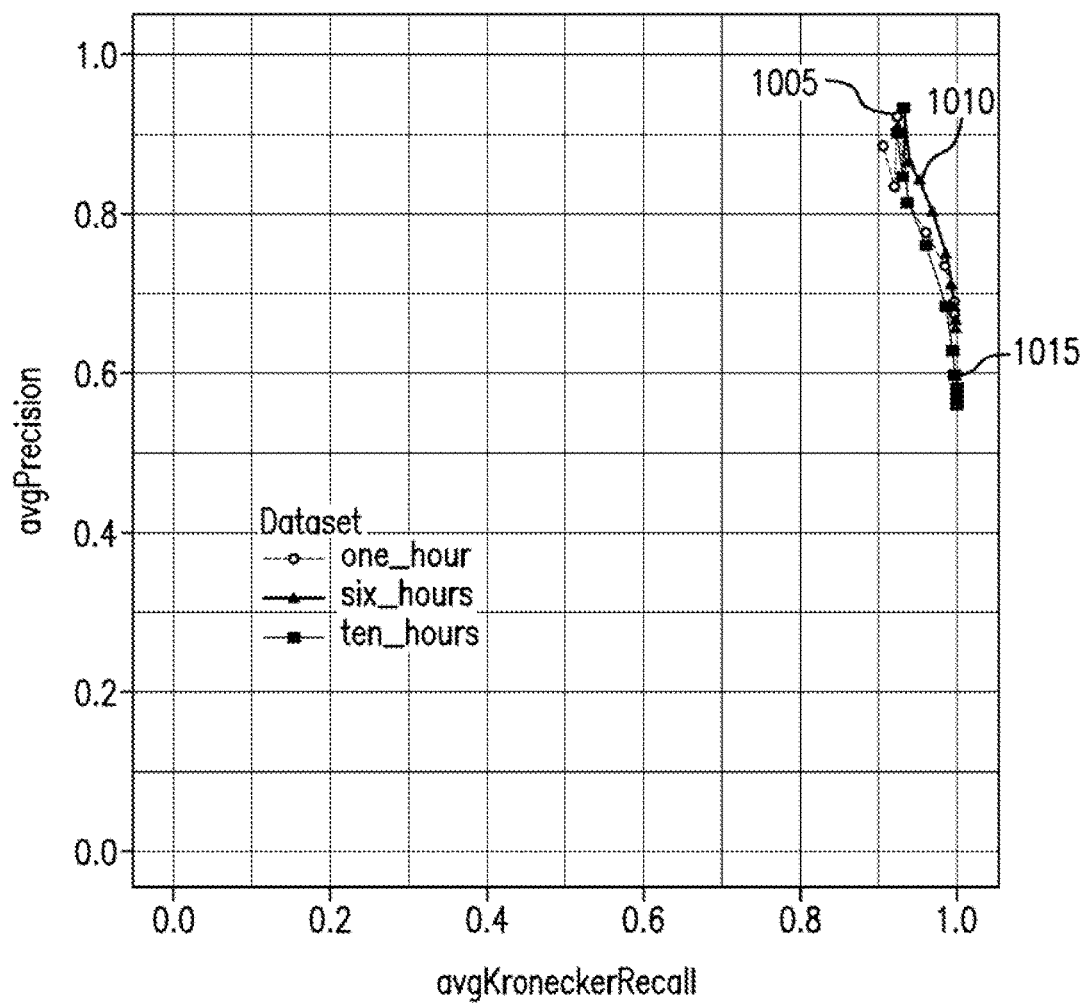
FIG. 10A is a graph illustrating an exemplary precision recall curve with full range according to an exemplary embodiment of the present disclosure.
Figure 10B:
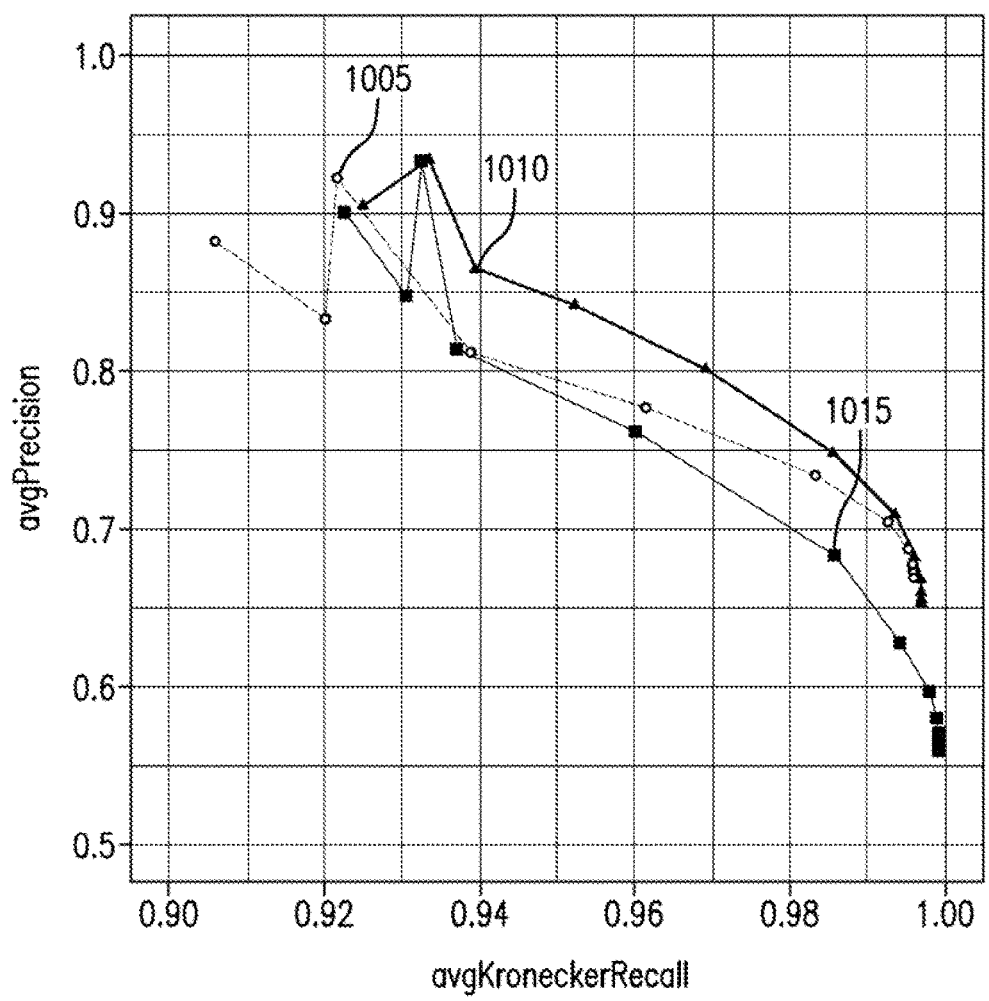
FIG. 10B is a graph illustrating an exemplary precision recall curve with magnified range according to an exemplary embodiment of the present disclosure.

FIGS. 10A and 10B illustrate exemplary results assessing whether the AID can predict interests well, as represented by the CCD categories. Three different data samples are used representing time frames of one hour 1005, six hours 1010, and ten hours 1015. The exemplary curves can represent the average precision/average Kronecker recall tradeoffs achieve by varying the threshold τ. FIG. 10A shows that for all threshold values, the average precision and Kronecker recall can both be quite high. FIG. 10B shows an illustration which magnifies an important part of the exemplary graph.

The results illustrated in FIGS. 10A and 10B show that the results do not vary much based on the different timeframes (e.g., between one and ten hours). In most or all exemplary cases, average Kronecker recall is better than 90%, with precisions varying from 60% to better than 90%, as i can be varied. This can indicate that the AID categories can include the page's contextually determined interest categories in the estimated audience interest distributions, even though the AID categories are estimated based on traffic to other webpages. The exemplary slope of the curves is steep. This can indicate that the contextual categories can actually be the categories with generally the strongest representation in the AID. As i can be increased, the precision can go up towards one—so even as the AID categories are culled, in most cases at least one of the "true" contextual categories remains.

Figure 11A:
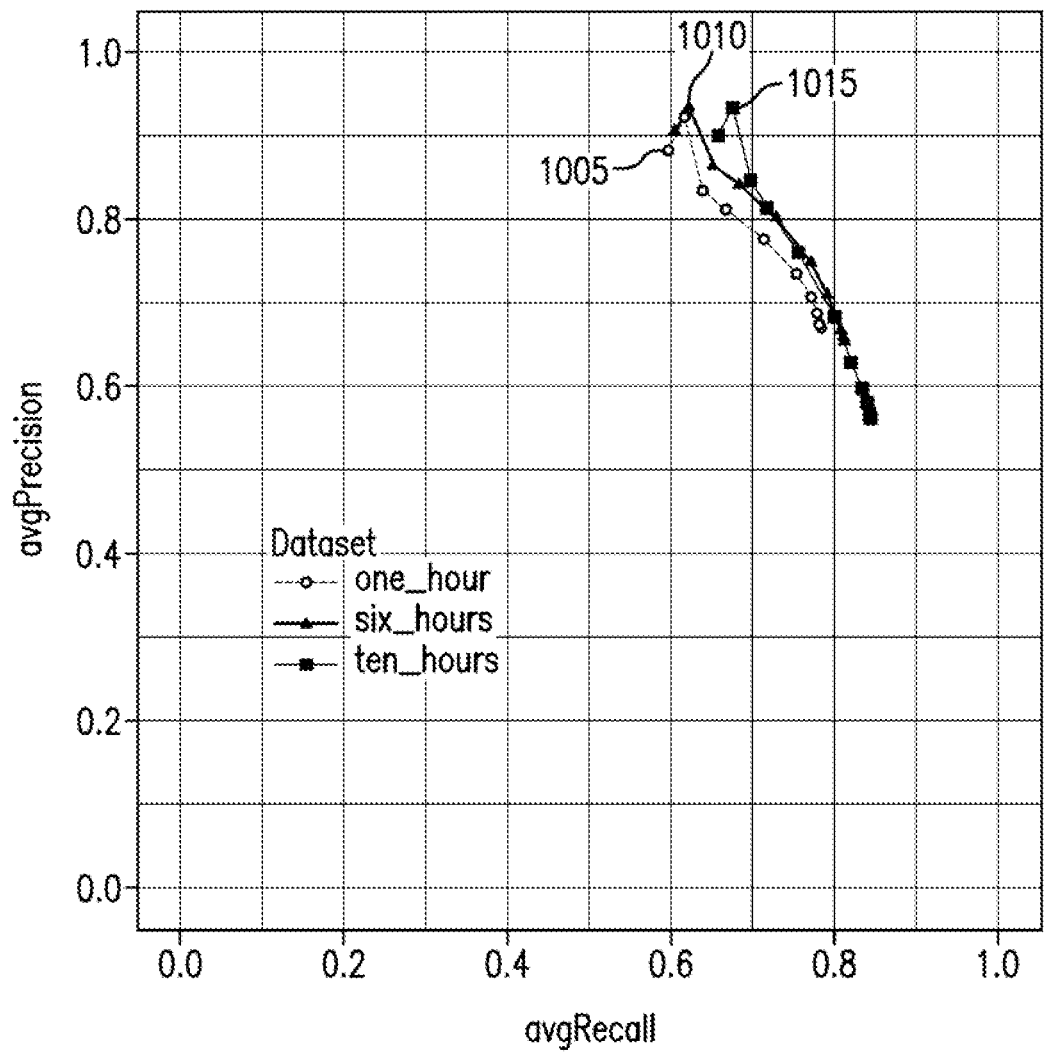
FIG. 11A a graph illustrating a further exemplary precision recall curve with full range according to an exemplary embodiment of the present disclosure.
Figure 11B:
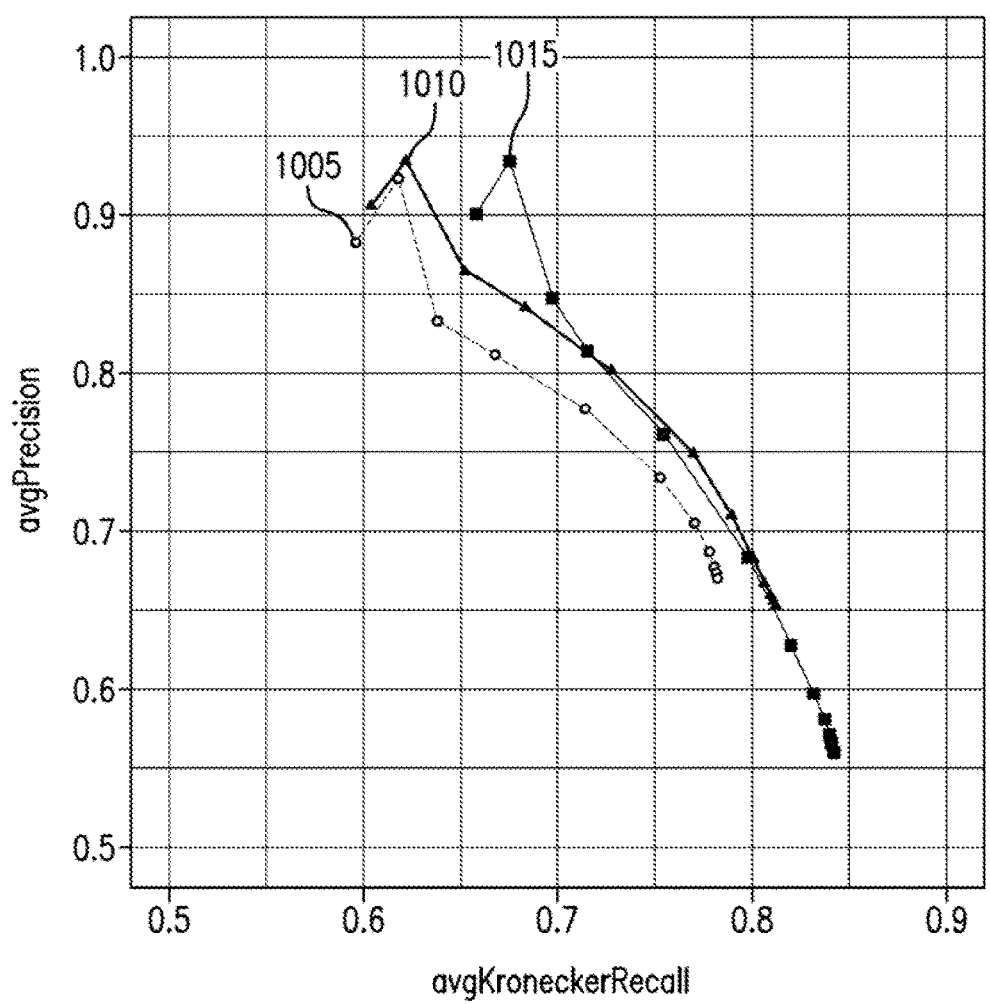
FIG. 11B is a graph illustrating an a further exemplary precision recall curve with magnified range according to an exemplary embodiment of the present disclosure.

FIGS. 11A and 11B illustrate exemplary results from the same experiments, except showing average regular recall instead of average Kronecker recall. These exemplary results are presented mainly for a more extensive analysis. For example, regular recall can require that the AID can predict all categories on the site in order to achieve perfect recall. As shown in FIGS. 11A and 11B, average precision and recall can still be moderately high, with breakeven around 75% average precision and recall—that can be, on average for a webpage the AID predicts 75% of the categories in the CCD, and 75% of the predicted categories can actually be in the CCD. From this breakeven point, either precision or recall can be improved at the expense of the other.

Exemplary Follow-Up Analysis: Examination of Individual Discrepancies

Exemplary differences between AID and CCD can exist for several reasons. The examples used are summarized in Table 3 below. Such exemplary Table 3 shows the URL of the webpage, below which are shown: the original category or categories (e.g., column 3), the new categories (e.g., those that the AID adds, column 1), the missing categories (e.g., those that are in the CCD but not in the AID, column 2), and the type of case which each In some cases, the AID may not add categories, or no categories are missing, in which case the corresponding column is blank.

Consider the situation where the AID can represent the content better. The first case is where the AID can correct errors by removing "missing" categories (e.g., categories misrepresented by CCD). Table 3 shows an example: the website http://virus.emedtv.com/stomach-virus/stomach-virus.html can have "women's health, disease, and medicine" as its set of contextual categories. The AID of the website can be "disease, medicine", with "women's health" as the missing category. A quick look at the website shows that its content can be about a stomach virus; it can be health-related, but does not contain any specific content about women's health.

A third case is when AID can represent unexpected/surprising new categories, which appear odd at first sight, but make sense after some deeper analysis. For example, a website can have a contextual category of "relationships". The AID can add categories "beauty, medicine, style". The exemplary content of website can discuss different problems within a relationship. The added AID categories can actually represent the typical interests of the readers of the content, which often can have "self-help" articles in addition to their usual fare of articles on various relationship issues.

TABLE 3

Detailed New and Missing Categories

| New AID Categories | Missing CCD | CCD Categories | Type of |
|---|---|---|---|
| http://www.forumice.com/forumdisplay.php?4- Montreal- | | | |
| style, beauty | | hockey | Case 3 |
| http://virus.emedtv.com/stomach- virus/stomach- virus.html | | | |
| | women's health | women's health, disease, and | Case 1 |
| http://eatthis.womenshealthmag.com/slide/7- worst- burger- | | | |
| weight loss, dining out | | gastronomy | Case 2 |

TABLE 3-continued

Detailed New and Missing Categories

| New AID Categories | Missing CCD | CCD Categories | Type of |
|---|---|---|---|
| http://www.frommers.com/slideshow/?p=6&group=785&cat cd=AIR | | | |
| tourist destinations | | transports | Case 2 |
| http://www.jigidi.com/puzzle | | | |
| | babies and toddlers | games, babies and toddlers | Case 1 |

Exemplary Follow-Up Analysis: Websites Difficult to Categorize Contextually.

The quantitative experimental analysis focused on pages that actually received a contextual classification; however, many do not. This is appropriate for the purpose of the experiment, namely to judge whether the AID can indeed classify pages by interest. However, as discussed above, one of the most interesting opportunities for the AID model are cases where contextual classification performs poorly (e.g., in the case of automated classification) or is quite expensive (e.g., in the case of human classification), or both. Common examples can include image pages, video pages, and music pages. Manual examination of the experimental dataset can show that it does include these sorts of pages, and indeed the contextual classification performs relatively poorly on them.

For an exemplary analysis, all URLs from a popular image sharing domain imgur.com were sampled from one of the experimental datasets. Out of a total of 767 pages, only 7.0% (e.g., 54 of them) have the same AID with CCD. The other 93.0% all have either new AID categories or missing categories. Do those AID categories do a substantially better job of depicting the audience interest?

In the CCD of the 767 photo pages, the top three categories were: "software" (757), "fine art" (371) and "personal finance" (349). AID adds "humor" to 442 of the pages which do not have "humor" as a contextual category. In order to judge whether the new AID-estimated interest categories seem as good as or better than the original categories, the actual content should be looked at.

Several exemplary qualitative conclusions can be drawn. The CCD category "software" simply seems to be a gross misclassification. The CCD category "fine arts" can be wrong as well for most of the pictures sampled. In a semi-quantitative analysis, two dozen pictures are randomly sampled and labeled as "fine arts." None could be fairly judged as fine art. The closest can be a nice Bob Marley portrait made with the tape pulled out of a cassette tape, and a nice nature photo; almost all were humorous photos. The nature photo seemed to be misclassified as "humor" by the CCD; the AID did not include "humor".

Figure 12A:
FIGS. 12A-12C are exemplary images from exemplary websites.
Figure 12B:
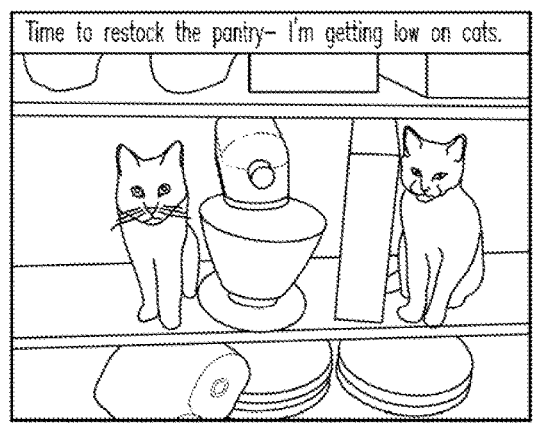
Figure 12C:
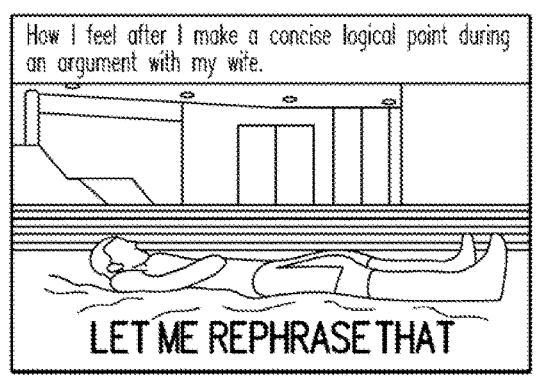
Figure 13A:
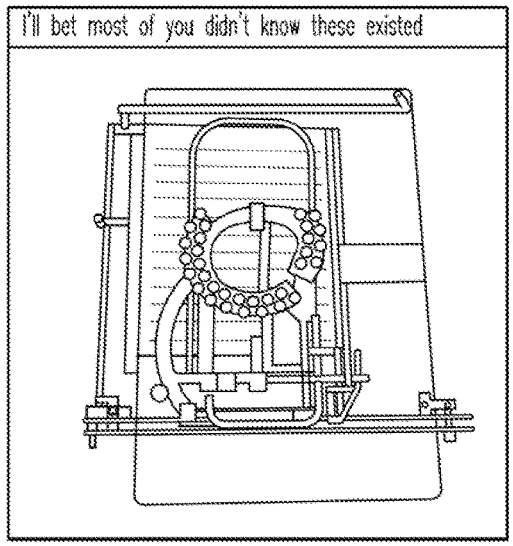
FIGS. 13A-13C are further exemplary images from exemplary websites.
Figure 13B:
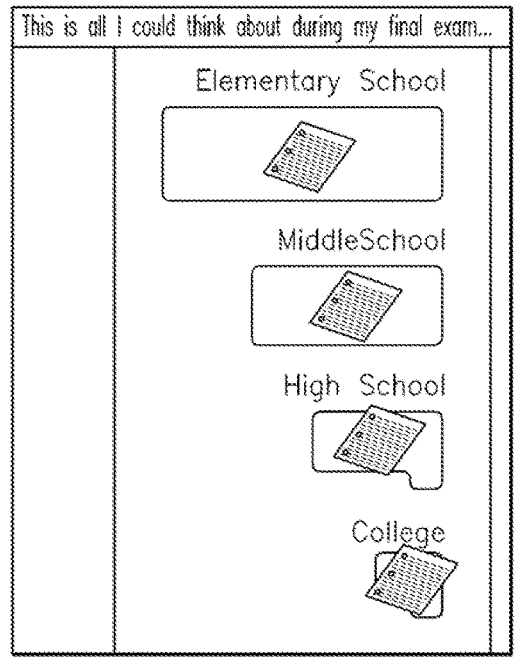
Figure 13C:
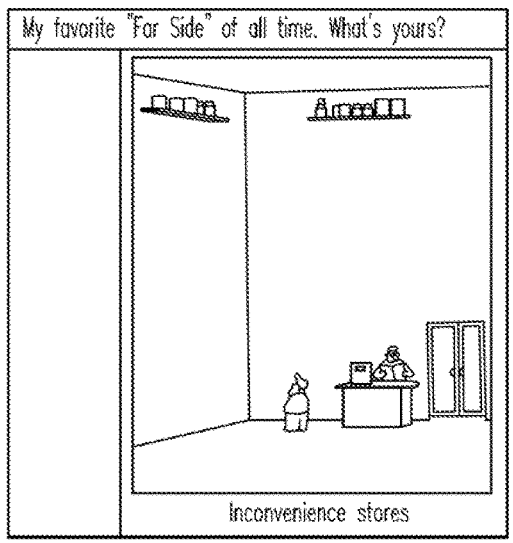
Figure 14A:
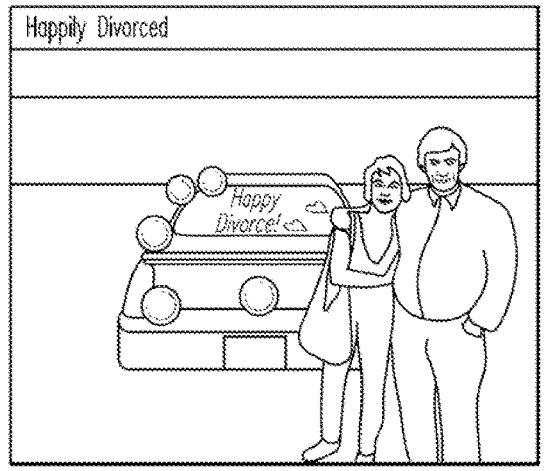
FIGS. 14A-14C are even further exemplary images from exemplary websites.
Figure 14B:
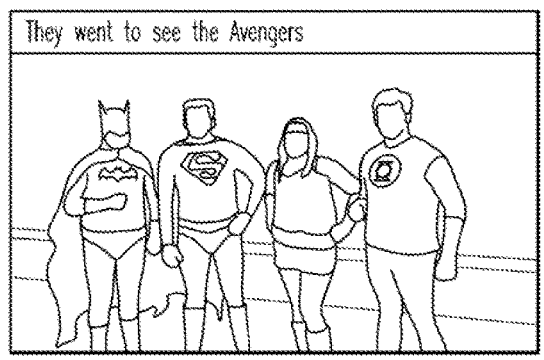
Figure 14C:
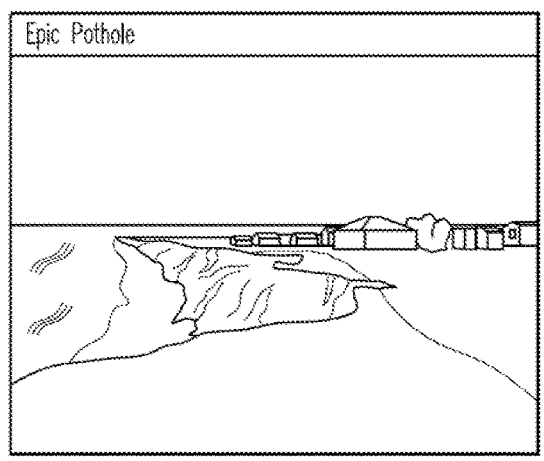

The exemplary categories that the AID can provide support that the exemplary model can estimate interests of users, even when the contextual categorization cannot. For example, the AID can add "humor" to various photos; this is because many of them are humorous photos. However, there can also be more subtle additions made by the AID. For example, to the Spiderman (e.g., FIG. 12A) and Avengers photo (e.g., FIG. 12A), the AID can add "celebrity fan/gossip". To the "Epic Pothole" photo (e.g., FIG. 14C), the AID can add the category "transports." To the school comic (e.g., FIGS. 13B and 13C), "motherhood" and "social institution" are added. To the strange contraption with the rotary keyboard (e.g., FIG. 14A), which appears to be a music typewriter, the AID can add "radio" and "cinema". To the restock pantry photo (e.g., FIG. 12B) the AID can add "humor" and remove "advertising". For the "let me rephrase that" photo (e.g., FIG. 12C) the AID can add "humor" and "fine art". It is worth reiterating that the exemplary comparison with contextual categories is based on the assumption that when accurate, the contextual categories can have an overlap with the AID categories. The AID categories can represent the interests of the visitors, which may not be directly relevant to the actual content. The users who visited the photo of the music-writer tended also to visit "radio" and "cinema" pages.

Exemplary Conclusion

The emergence of massive data on users' online behavior has generated an extensive amount of attention both in academia and industry. The exemplary systems, methods and computer-accessible mediums, according to an exemplary embodiment of the present disclosure, can rely on the website visitation behaviors of massive number of users to build an AID for each website. The interest distribution is dynamic, and behavior-generated, and thus is different than studies based on categorizing the content of websites. The exemplary model can estimate individual users' interest distributions based on their website visitation patterns, and the contextual categories of the websites that the users visit. Using these exemplary estimated user interest distributions, the exemplary model then calculates the expected AID of each website. The exemplary model can provide the following meaning for an AID: across most or all visits to a website, if one were to randomly draw one visit, the interest distribution of this unknown visitor is the AID.

Anonymous user/website visitation data is gathered from a firm embedded in the online advertising ecosystem, and can combine this visitation data with contextual categories from a leading contextual categorization firm. Using this data, a large scale empirical study was conducted. The main quantitative results show that if high-quality contextual categories are interpreted as representing partial interests of users, then the estimated AID can estimate the interests of site visitors. The AID can remove categories that seem incorrect, and can add in categories that seem to be reasonable audience interests, but may not be directly represented in the content. It is shown how for websites/webpages that are difficult or impossible for contextual methods to classify well, the AID can provide impressive, intuitive, and subtle estimations of the audiences' interests.

Exemplary audience interest estimation is of interest to managers for many different reasons. Understanding audience interests can help managers of companies with significant web presence to optimize their content and navigation, create better content for their audience, improve site merchandizing such as the placement of product links and internal offers, solicit sponsorship, and perform other audience analytics. In addition, understanding audience interests is an important goal of many companies in the online advertising industry, where advertisers want to target advertisements based on the interests of website visitors.

Figure 17:
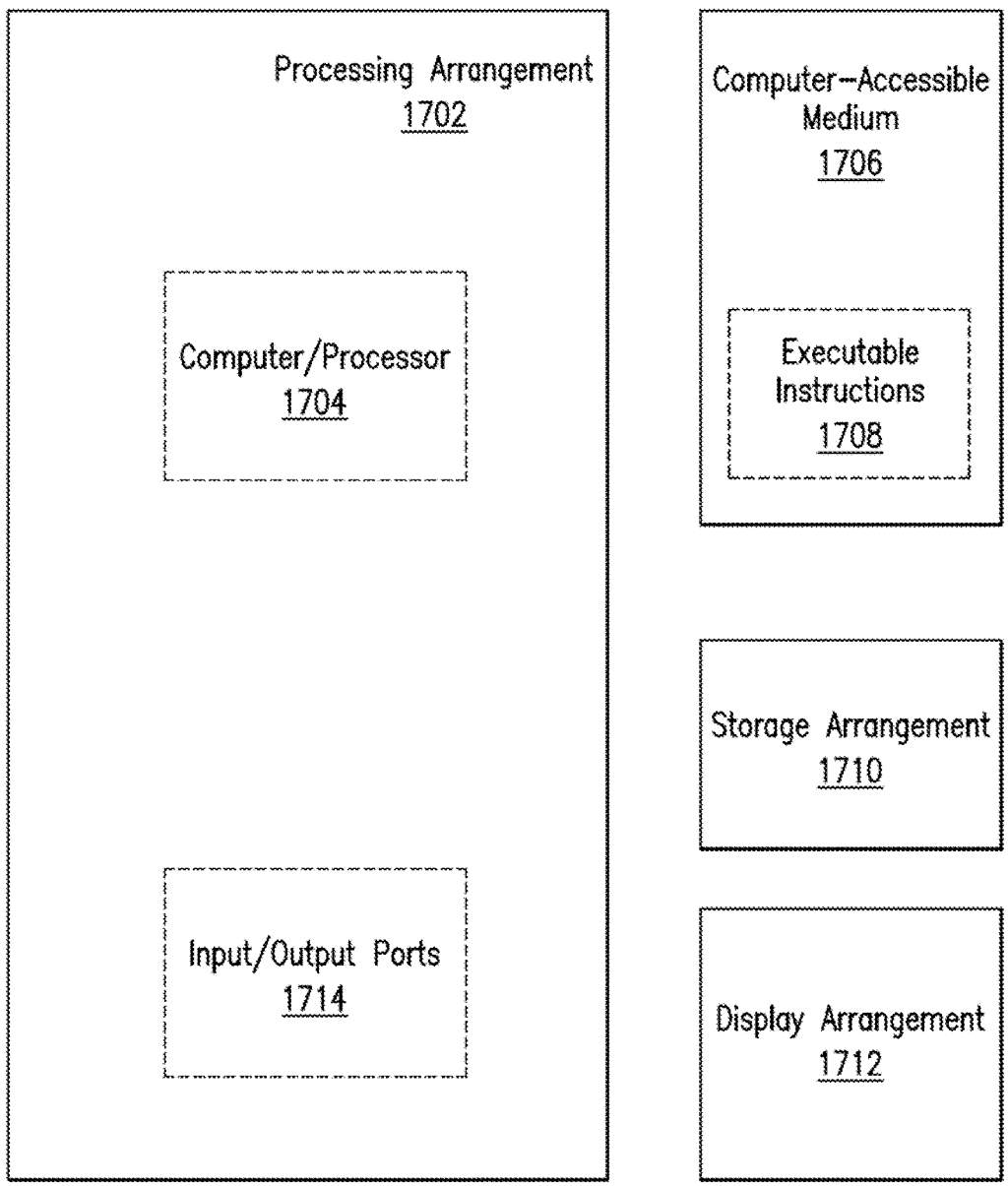
FIG. 17 is an illustration of an exemplary block diagram of an exemplary system in accordance with certain exemplary embodiments of the present disclosure.

FIG. 17 shows a block diagram of an exemplary embodiment of a system according to the present disclosure. For example, exemplary procedures in accordance with the present disclosure described herein can be performed by a processing arrangement and/or a computing arrangement 1702. Such processing/computing arrangement 1702 can be, for example, entirely or a part of, or include, but not limited to, a computer/processor 1704 that can include, for example, one or more microprocessors, and use instructions stored on a computer-accessible medium (e.g., RAM, ROM, hard drive, or other storage device).

As shown in FIG. 17, for example, a computer-accessible medium 1706 (e.g., as described herein above, a storage device such as a hard disk, floppy disk, memory stick, CD-ROM, RAM, ROM, etc., or a collection thereof) can be provided (e.g., in communication with the processing arrangement 1702). The computer-accessible medium 1706 can contain executable instructions 1708 thereon. In addition or alternatively, a storage arrangement 1710 can be provided separately from the computer-accessible medium 1706, which can provide the instructions to the processing arrangement 1702 so as to configure the processing arrangement to execute certain exemplary procedures, processes and methods, as described herein above, for example.

Further, the exemplary processing arrangement 1702 can be provided with or include an input/output arrangement 1714, which can include, for example, a wired network, a wireless network, the internet, an intranet, a data collection probe, a sensor, etc. As shown in FIG. 17, the exemplary processing arrangement 1702 can be in communication with an exemplary display arrangement 1712, which, according to certain exemplary embodiments of the present disclosure, can be a touch-screen configured for inputting information to the processing arrangement in addition to outputting information from the processing arrangement, for example. Further, the exemplary display 1712 and/or a storage arrangement 1710 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Exemplary Appendix A: Simulation

An exemplary purpose of the exemplary simulation is to intuitively illustrate how the exemplary model works and also provide for the correctness of the exemplary model. The setup of the simulation may not be representative of a real dataset, so statistics of the results here may not align with those from the real dataset.

Figure 15A:
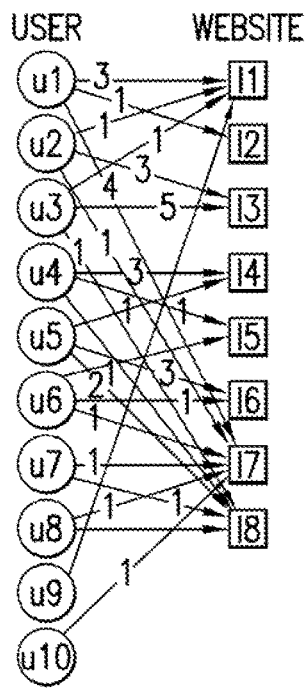
FIG. 15A is a full graph of an exemplary model according to an exemplary embodiment of the present disclosure.

The exemplary simulation can assume, e.g., a "perfect", or otherwise simplified, world where all users behave under the assumptions above, that users look for websites whose contextual categories overlap with users' interests. It is "perfect" because a user only visits websites that contain her/his own interests. For example, user u1 interested in category A only visits websites that contain category A, which can be l1, l2, and l7. A small bipartite graph is randomly generated on the assumption. FIG. 15A shows this visitation graph. The number of visits from users to websites is shown as a label of the link between them. As is seen below, websites l1 to l3 only contain contents of contextual category A, l4 to l6 only contain content of B, and l7 and l8 contain content of both A and B with equal weight.

Figure 15B:
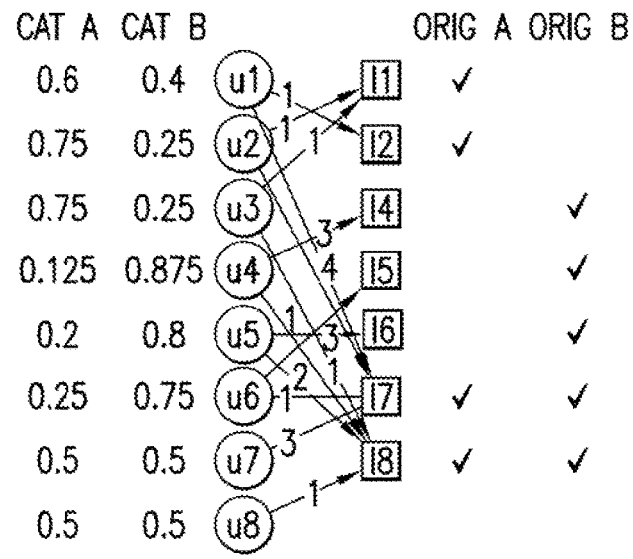
FIG. 15B is an interference graph of the exemplary model according to an exemplary embodiment of the present disclosure.
Figure 16:
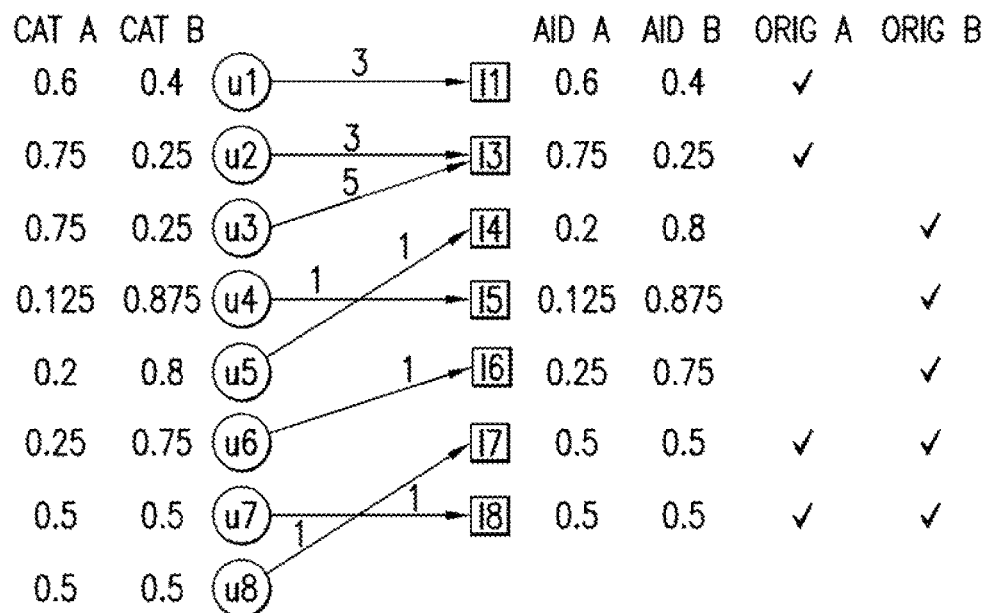
FIG. 16 is an aggregation graph of the exemplary model according to an exemplary embodiment of the present disclosure.

The full graph is processed by excluding singleton users, and splitting the full graph into an aggregation graph and an inference graph, which are shown in FIG. 16 and FIG. 15B. As an example, all links from user u1 can be randomly split into either the inference graph (link u1→l2) or the aggregation graph (links u1→l1 and u1→l7). The checkmarks in the inference/aggregation graph can indicate each website's contextual categories. The exemplary probabilities on the left part of both graphs can indicate the user interest distribution (UID) Γ estimated by the inference stage of the exemplary model. Take u4 for example, its UID <0.125, 0.875> can be large in B because it visits a category-B-only website (l4) three times, yet visits a category-A-and-B website l8 only once. The exemplary probabilities on the right part of the aggregation model can indicate the audience interest distribution (AID) $\beta_w^k$ for each website, calculated by the aggregation stage of the exemplary model. All websites AID "recover" the original CCD correctly by plurality vote (on the probabilities). For example, u5 can have a larger probability in category B (0.875) than in category A (0.125), because it can contain only contextual category B.

Exemplary Appendix B: Maximum Likelihood Estimation of Users' Interest Distribution For user n, the user's number of visits to category k (denoted by random variable $X_n^k$) can be distributed according to a multinomial distribution. Thus the likelihood function can be, for example:

$$L(L_n, \vec{\gamma_n}) = Pr(X_n^1 = L_n^1, X_n^2 = L_n^2, \ldots, X_n^K = L_n^K \mid L_n, \vec{\gamma_n}) = \frac{L_n!}{L_n^1! \ldots L_n^K!} \prod_{k=1}^{K} (\gamma_n^k)^{L_n^k}, \quad (31)$$

where $L_n$ can be the total number of visits from user n to all websites, $\vec{\gamma}_n$ can be the audience interest distribution for user n.

The log-likelihood function then can be, for example:

$$l(L_n, \vec{\gamma_n}) = \log Z + \sum_k L_n^k \log(\gamma_n^k), \quad (32)$$

where Z can be the content. To obtain the maximum likelihood with constraint that $\Sigma_k \gamma_n^k = 1\lambda$ can be introduced to maximize the following, for example:

$$\tilde{l} = \log Z + \sum_k L_n^k \log(\gamma_n^k) + \lambda \left(1 - \sum_k \gamma_n^k\right). \quad (33)$$

Take the derivative with regard to $\gamma_n^k$ then, for example:

$$\frac{\partial \tilde{l}}{\partial \gamma_n^k} = \frac{L_n^k}{\gamma_n^k} - \lambda = 0. \quad (34)$$

Take the derivative with regard to λ, then, for example:

$$\frac{\partial \tilde{l}}{\partial \lambda} = 1 - \sum_k \gamma_n^k = 0. \quad (35)$$

From equation 34 and equation 35, for example:

$$\gamma_n^k = \frac{L_n^k}{\lambda} \quad (36)$$

$$1 = \sum_k \gamma_n^k = \frac{\sum_k L_n^k}{\lambda} = \frac{L_n}{\lambda} \quad (37)$$

$$L_n = \lambda \quad (38)$$

$$(\gamma_n^k)^{MLE} = \frac{L_n^k}{L_n}. \quad (39)$$

From equation 39, it is known that the exemplary maximum likelihood estimator of γk for user n based on the exemplary model can be $$(\gamma_n^k)^{MLE} = \frac{L_n^k}{L_n},$$

which is the frequency of user n's visit to category (e.g., site) k across user n's visits to all categories (e.g., sites).

EXEMPLARY REFERENCES

The following references are hereby incorporated by reference in their entirety.
1. Adomavicius, Gediminas, Alexander Tuzhilin. 2005. Toward the next generation of recommender systems: A survey of the state-of-the-art and possible extensions. *IEEE TRANSACTIONS ON KNOWLEDGE AND DATA ENGINEERING* 17(6) 734-749.
2. Attenberg, Josh, Foster J. Provost. 2011. Online active inference and learning. KDD. 186-194.
3. Bilenko, Mikhail, Matthew Richardson. 2011. Predictive client-side profiles for personalized advertising. *Proceedings of the 17th ACM SIGKDD international conference on Knowledge discovery and data mining*. KDD '11, 413-421.
4. Broder, Andrei, Marcus Fontoura, Vanja Josifovski, Lance Riedel. 2007. A semantic approach to contextual advertising. *Proceedings of the 30th annual international ACM SIGIR conference on Research and development in information retrieval*. SIGIR '07, 559-566.
5. Chen, Ye, Dmitry Pavlov, John F. Canny. 2009. Large-scale behavioral targeting. *Proceedings of the 15th ACM SIGKDD international conference on Knowledge discovery and data mining*. KDD '09, 209-218.
6. Chen, Ye, Dmitry Pavlov, John F. Canny. 2010. Behavioral targeting: The art of scaling up simple algorithms. *ACM Trans. Knowl. Discov. Data* 4(4) 17:1-17:31.
7. Chu, Wei, Seung-Taek Park. 2009. Personalized recommendation on dynamic content using predictive bilinear models. *Proceedings of the 18th international conference on World wide web*. WWW '09, 691-700.

8. Damasio, Manuel Jose, Carlos Poupa. 2008. Understanding online audiences: New research approaches. *Media Psycholog Review.*
9. Dean, Jeffrey, Sanjay Ghemawat. 2008. Mapreduce: simplified data processing on large clusters. *Commun.* ACM 51(1) 107-113.
10. Desrosiers, Christian, George Karypis. 2011. A comprehensive survey of neighborhood-based recommendation methods. *Recommender Systems Handbook.* 107-144.
11. Eckersley, Peter. 2010. Browser versions carry 10.5 bits of identifying information on average. URL https://www.eff.org/deeplinks/2010/01/tracking-by-user-agent.
12. Harger, Emma. 2012. Hey sports illustrated, we are not puck bunnies: Fans take. URL http://sports.yahoo.com/nhl/news?slug=ycn-11079624.
13. HockeyBroad. 2012. Dear si: Not all female hockey fans are puck bunnies. URL http://www.hockeybroad.com/2012/03/dear-si-not-all-female-hockey-fans-are.html.
14. Huang, Zan, Daniel D. Zeng, Hsinchun Chen. 2007. Analyzing consumer-product graphs: Empirical findings and applications in recommender systems. *Manage. Sci.* 53(7) 1146-1164.
15. Ipeirotis, Panagiotis G., Foster Provost, Jing Wang. 2010. Quality management on amazon mechanical turk. *Proceedings of the ACM SIGKDD Workshop on Human Computation.* HCOMP '10, 64-67.
16. Koren, Yehuda, Robert Bell, Chris Volinsky. 2009. Matrix factorization techniques for recommender systems. *Computer* 42(8) 30-37.
17. Li, Ting, Ning Liu, Jun Yan, Gang Wang, Fengshan Bai, Zheng Chen. 2009. A markov chain model for integrating behavioral targeting into contextual advertising. *Proceedings of the Third International Workshop on Data Mining and Audience Intelligence for Advertising.* ADKDD '09, 1-9.
18. Lops, Pasquale, Marco de Gemmis, Giovanni Semeraro. 2011. Content-based recommender systems: State of the art and trends. *Recommender Systems Handbook.* 73-105.
19. Manning, Christopher D., Prabhakar Raghavan, Hinrich Schtze. 2008. *Introduction to Information Retrieval.* Cambridge University Press, New York, N.Y., USA.
20. Minka, T. 2003. Bayesian inference, entropy and the multinomial distribution. *Technical report*, Microsoft Research.
21. Murphy, Kevin P. 2006. Binomial and multinomial distributions. *Technical Report,* University of British Columbia.
22. Palmer, Elena. 2012. Sports illustrated salutes "puck bunnies"; shockingly, im annoyed. URL http://aeryssports.com/eye-on-the-storm/sports-illustrated-salutes-puck-bunnies-shockingly-im-annoyed.
23. Pandey, Sandeep, Mohamed Aly, Abraham Bagherjeiran, Andrew Hatch, Peter Ciccolo, Adwait Ratnaparkhi, Martin Zinkevich. 2011. Learning to target: what works for behavioral targeting. *Proceedings of the 20th ACM international conference on Information and knowledge management.* CIKM '11, 1805-1814.
24. Provost, Foster J., Brian Dalessandro, Rod Hook, Xiaohan Zhang, Alan Murray. 2009. Audience selection for on-line brand advertising: privacy-friendly social network targeting. KDD. 707-716.
25. Ribeiro-Neto, Berthier, Marco Cristo, Paulo B. Golgher, Edleno Silva de Moura. 2005. Impedance coupling in content-targeted advertising. *Proceedings of the 28th annual international ACM SIGIR conference on Research and development in information retrieval.* SIGIR '05, 496-503.
26. The Apache Software, Foundation. 2012a. Hadoop. URL http://hadoop.apache.org/.
27. The Apache Software, Foundation. 2012b. Hbase. URL http://hbase.apache.org/.
28. The Apache Software, Foundation. 2012c. Pig. URL http://pig.apache.org/.
29. Umyarov, Akhmed, Alexander Tuzhilin. 2011. Using external aggregate ratings for improving individual recommendations. ACM Trans. Web 5(1) 3:1-3:40.
30. Wasserman, Larr. 2004. *All of statistics: a concise course in statistical inference.*
31. Weisstein, Eric W. 2012. Kronecker delta. *MathWorld—A Wolfram Web Resource.*
32. Wikipedia. 2012. Categorical distribution—Wikipedia, the free encyclopedia.
33. Yan, Jun, Ning Liu, Gang Wang, Wen Zhang, Yun Jiang, Zheng Chen. 2009. How much can behavioral targeting help online advertising? *Proceedings of the 18th international conference on World wide web.* WWW '09, 261-270.

What is claimed is:

1. A non-transitory computer-accessible medium having stored thereon computer-executable instructions for determining at least one audience interest distribution of at least one first content, wherein, when a computer hardware arrangement executes the instructions, the computer hardware arrangement is configured to perform procedures comprising:
   a. receiving first information related to at least one score for the at least one first content and at least one second content, wherein the at least one score is based on a plurality of categories assigned to the at least one first content and the at least one second content;
   b. determining second information related to a total number of times each of a plurality of users interacted with the at least one first content and the at least one second content;
   c. determining third information related, to an importance level of (i) the at least one first content for each of the plurality of categories based on the first information and (ii) the at least one second content for each of the plurality of categories based on the first information;
   d. determining fourth information related to an importance level of each of the plurality of categories for (i) the at least one first content based on the first information and (ii) the at least one second content based on the first information;
   e. determining a plurality of user interest distributions, wherein a user interest distribution for a particular user is based on the second information associated with the particular user, and the fourth information, and wherein the user interest distribution for the particular user includes a set of scores for each of a plurality of further categories; and
   f. determining the at least one audience interest distribution of the at least one first content using the plurality of user interest distributions based on the second information, the third information and the fourth information, wherein the at least one first content is different from the at least one second content.

2. The non-transitory computer-accessible medium of claim 1, wherein the computer arrangement is further configured to determine the audience interest distributions based on at least one probabilistic model of the plurality of user interest distributions the second information, the third information and the fourth information.

3. The non-transitory computer-accessible medium of claim 2, wherein the at least one probabilistic model includes a maximum likelihood estimator.

4. The non-transitory computer-accessible medium of claim 1, wherein the at least one first content and the at least one second content include at least one webpage.

5. The non-transitory computer-accessible medium of claim 1, wherein the plurality of categories are based on a type of content that the at least one first content and the at least one second content belong to.

6. The non-transitory computer-accessible medium of claim 1, wherein the at least one score is based on semantics and natural language processing applied to the at least one first content and the at least one second content.

7. The non-transitory computer-accessible medium of claim 1, wherein the plurality of categories include a plurality of topical interest categories associated with the at least one first content and the at least one second content.

8. The non-transitory computer-accessible medium of claim 1, wherein the computer arrangement is further configured to determine the plurality of categories based on at least one further content.

9. The non-transitory computer-accessible medium of claim 1, wherein the plurality of user interest distributions include further information related to inherent preferences by each of the users for at least one of the plurality of categories.

10. The non-transitory computer-accessible medium of claim 1, wherein the computer hardware arrangement is configured to determine the at least one audience distribution using a weighted mean of the plurality of user interest distributions, wherein the weighted mean is based on the second information, the third information and the fourth information.

11. The non-transitory computer-accessible medium of claim 1, wherein the computer arrangement is further configured to model the user interest distributions using at least one matrix based on the second information and the fourth information, and wherein each row vector of the at least one matrix represents at least one user and each column of the at least one matrix represents at least one category.

12. The non-transitory computer-accessible medium of claim 1, wherein the computer arrangement is further configured to determine the audience interest distributions based on a multinomial distribution model.

13. The non-transitory computer-accessible medium of claim 1, wherein the computer arrangement is further configured to determine the plurality of user interest distributions by inferring the user interest distributions based on an inference model having a multinomial distribution.

14. The non-transitory computer-accessible medium of claim 13, wherein the inference model is an estimation of at least one of the plurality of user interest distributions based on a behavior of the users.

15. The non-transitory computer-accessible medium of claim 13, wherein the computer arrangement is further configured to generate the inference model by probabilistically modeling interactions of the users to a plurality of contents.

16. The non-transitory computer-accessible medium of claim 1, wherein the computer arrangement is further configured to determine the plurality of user interest distributions using at least one bipartite graph.

17. The non-transitory computer-accessible medium of claim 1, wherein the at least one first content and the at least one second content include at least one of (i) at least one video game, (ii) at least one movie, (iii) at least one song.

18. A method for determining at least one audience interest distribution of at least one first content, comprising:
   a. receiving first information related to at least one score for the at least one first content and at least one second content, wherein the at least one score is based on a plurality of categories assigned to the at least one first content and the at least one second content;
   b. determining second information related to a total number of times each of a plurality of users interacted with the at least one first content and the at least one second content;
   c. determining third information related to an importance level of (i) the at least one first content for each of the plurality of categories based on the first information and (ii) the at least one second content for each of the plurality of categories based on the first information;
   d. determining fourth information related to an importance level of each of the plurality of categories for (i) the at least one first content based on the first information and (ii) the at least one second content based on the first information;
   e. determining a plurality of user interest distributions, wherein a user interest distribution for a particular user is based on the second information associated with the particular user, and the fourth information, and wherein the user interest distribution for the particular user includes a set of scores for each of a plurality of further categories; and
   f. using a computer hardware arrangement, determining the at least one audience interest distribution of the at least one first content using the plurality of user interest distributions based on the second information, the third information and the fourth information, wherein the at least one first content is different from the at least one second content.

19. A system for determining at least one audience interest distribution of at least one first content, comprising: a computer processing arrangement configured to:
   a. receive first information related to at least one score for the at least one first content and at least one second content, wherein the at least one score is based on a plurality of categories assigned to the at least one first content and the at least one second content;
   b. determine second information related to a total number of times each of a plurality of users interacted with the at least one first content and the at least one second content;
   c. determine third information related to an importance, level of (i) the at least one first content for each of the plurality of categories based on the first information and (ii) the at least one second content for each of the plurality of categories based on the first information;
   d. determine fourth information related to an importance level of each of the plurality of categories for (i) the at least one first content based on the first information and (ii) the at least one second content based on the first information;
   e. determine a plurality of user interest distributions, wherein a user interest distribution for a particular user is based on the second information associated with the particular user, and the fourth information, and wherein the user interest distribution for the particular user includes a set of scores for each of a plurality of further categories; and
   f. determine the at least one audience interest distribution of the at least one first content using the plurality of user interest distributions based on the second information, the third information and the fourth information, wherein the at least one first content is different from the at least one second content.

\* \* \* \* \*